United States Patent
Hampel et al.

(10) Patent No.: US 11,700,565 B2
(45) Date of Patent: Jul. 11, 2023

(54) MANAGEMENT OF RADIO LINK FAILURE IN WIRELESS BACKHAUL

(71) Applicant: QUALCOMM Incorporated, San Diego, CA (US)

(72) Inventors: Karl Georg Hampel, Hoboken, NJ (US); Navid Abedini, Somerset, NJ (US); Muhammad Nazmul Islam, Littleton, NJ (US); Jianghong Luo, Skillman, NJ (US); Tao Luo, San Diego, CA (US); Hong Cheng, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 16/570,246

(22) Filed: Sep. 13, 2019

(65) Prior Publication Data

US 2020/0092784 A1    Mar. 19, 2020

Related U.S. Application Data

(60) Provisional application No. 62/732,910, filed on Sep. 18, 2018.

(51) Int. Cl.
*H04W 36/30* (2009.01)
*H04W 76/15* (2018.01)
(Continued)

(52) U.S. Cl.
CPC .......... *H04W 36/305* (2018.08); *H04B 7/14* (2013.01); *H04W 72/1268* (2013.01); *H04W 76/15* (2018.02); *H04W 76/27* (2018.02)

(58) Field of Classification Search
CPC .... H04W 36/405; H04W 76/15; H04W 76/27
See application file for complete search history.

(56) References Cited

U.S. PATENT DOCUMENTS 8,548,458 B2 * 10/2013 Huang .............. H04W 36/0085
370/242
2010/0251037 A1 * 9/2010 Cao ....................... H04L 49/557
714/57

(Continued)

OTHER PUBLICATIONS

International Search Report and Written Opinion—PCT/US2019/051268—ISA/EPO—dated Nov. 14, 2019.

(Continued)

*Primary Examiner* — Kevin M Cunningham
(74) *Attorney, Agent, or Firm* — Holland & Hart LLP

(57) ABSTRACT

Methods, systems, and devices for wireless communications are described. A relay device may detect an upstream radio link failure (RLF) associated with an upstream link of a wireless backhaul, where the wireless backhaul includes a first wireless link between the relay device and a first upstream backhaul device. The relay device may provide a first indication of the upstream radio link failure over a second wireless link between the relay device and a first downstream device. The relay device may establish a third wireless link with a second upstream backhaul device based on the detected upstream radio link failure. The relay device may provide multiple-access services to one or more downstream devices, where providing the multiple-access services is based on backhaul communications between the relay device and the second upstream backhaul device over the third wireless link.

23 Claims, 15 Drawing Sheets

(51) Int. Cl.
*H04B 7/14* (2006.01)
*H04W 72/1268* (2023.01)
*H04W 76/27* (2018.01)

(56) References Cited

U.S. PATENT DOCUMENTS

| | | | | |
|---|---|---|---|---|
| 2011/0038253 | A1* | 2/2011 | Yabusaki | H04L 45/125 370/217 |
| 2011/0268085 | A1* | 11/2011 | Barany | H04W 36/0033 370/331 |
| 2012/0083203 | A1* | 4/2012 | Truong | H04W 52/46 455/10 |
| 2012/0263035 | A1* | 10/2012 | Nakanishi | H04L 45/28 370/225 |
| 2012/0327801 | A1* | 12/2012 | Seo | H04B 1/74 370/252 |
| 2013/0331097 | A1* | 12/2013 | Kang | H04W 8/005 455/434 |
| 2019/0356407 | A1* | 11/2019 | Al Sayeed | H04J 14/0268 |
| 2019/0394825 | A1* | 12/2019 | Byun | H04W 76/11 |
| 2020/0077310 | A1* | 3/2020 | Cheng | H04W 36/305 |
| 2020/0287615 | A1* | 9/2020 | Zhu | H04B 7/155 |
| 2021/0099877 | A1* | 4/2021 | Nair | H04W 36/305 |

OTHER PUBLICATIONS

LG Electronics: "Discussions on Node Behavior for IAB Link Management", 3GPP Draft, 3GPP TSG RAN WG1 #94, R1-1808515_Discussions on Node Behavior for IAB Link Management, 3rd Generation Partnership Project (3GPP), Mobile Competence Centre, 650, Route Des Lucioles, F-06921 Sophia-Antipolis CE, vol. RAN WG1, No. Gothenburg, Sweden, Aug. 20, 2018-Aug. 24, 2018, Aug. 11, 2018 (Aug. 11, 2018), XP051515893, pp. 1-7, Retrieved from the Internet: URL:http://www.3gpp.org/ftp/tsg%5Fran/WG1%5FRL1/TSGR1%5F94/Docs/R1%2D1808515%2Ezip [retrieved on Aug. 11, 2018].

* cited by examiner

MANAGEMENT OF RADIO LINK FAILURE IN WIRELESS BACKHAUL

CROSS REFERENCE

The present application for patent claims benefit of U.S. Provisional Patent Application No. 62/732,910 by HAMPEL et al., entitled "MANAGEMENT OF RADIO LINK FAILURE IN WIRELESS BACKHAUL," filed Sep. 18, 2018, assigned to the assignee hereof, and expressly incorporated by reference in its entirety.

BACKGROUND

The following relates generally to wireless communications, and more specifically to management of radio link failure (RLF) in wireless backhaul.

Wireless communications systems are widely deployed to provide various types of communications content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication for multiple communications devices, which may be otherwise known as user equipment (UE).

Wireless communications systems may operate in millimeter wave (mmW) frequency ranges, e.g., 28 gigahertz (GHz), 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communications systems, transmissions from the base station and/or the UE may be beamformed. Moreover, a receiving device may use beamforming techniques to configure antenna(s) and/or antenna array(s) such that transmissions are received in a directional manner.

Some wireless communications systems, such as those operating in a mmW spectrum, may include access nodes (ANs), which may also be referred to as anchor nodes or devices, to facilitate wireless communication between a UE and the network. In some cases, an anchor AN (or anchor device) may have a high-capacity, wired, backhaul connection (e.g., fiber) to the network, while communicating simultaneously with one or more downstream ANs (e.g., downstream relay devices) or UEs. A network that supports communications between an AN and a UE may be referred to as an access network, while a network that supports communications between one or more ANs may be referred to as a backhaul network and/or a wireless backhaul. In deployments supporting both access and backhaul (e.g., in an Integrated Access and Backhaul (IAB) network), the wireless link may suddenly become unusable or otherwise unavailable, e.g., an RLF may occur. Conventionally, a central function (e.g., part of the core network) may manage wireless links within the wireless backhaul network. However, in the situation where the RLF occurs suddenly, the central function may not have sufficient time or advanced warning to adequately manage interconnectivity between the nodes within the IAB during an RLF. This may result in a loss of communications, extensive delays, and the like.

SUMMARY

The described techniques relate to improved methods, systems, devices, and apparatuses that support management of radio link failure (RLF) in wireless backhaul. Generally, the described techniques provide for improved techniques for detection and recovery from an RLF event in a wireless backhaul network, e.g., such as an Integrated Access and Backhaul (IAB) network. Broadly, a node within the backhaul network (e.g., which may also be referred to as a relay node or relay device) may monitor the wireless link quality as well as listen for an alert message from upstream backhaul device(s). When the relay device detects an RLF (e.g., by monitoring link quality or based on receiving an alert message from one upstream backhaul device), the relay device may undergo recovery procedures by connecting to an alternative parent relay, e.g., by using forward handover or activating a redundant link it already has with another parent relay. In the event that these attempts fail or if there is no redundant path or alternative parent available, the relay device has options on how best to proceed. In one option, the relay device may send a backhaul failure alert message to child nodes (e.g., a first indication of the upstream RLF to downstream device(s)), which allows the child nodes (e.g., child relay devices and/or user equipment (UE)) to find a new attachment point. Additionally or alternatively, the relay device may suspend certain services to signal to the child nodes an indication that the RLF event has occurred. For example, the relay device may suspend physical channels and signals, such as synchronization signals, reference signals, tracking reference signals, beam management signals, and the like. Suspending transmission of such physical channels and signals may lead to an RLF observation by the child nodes, which allows the child nodes to initiate or allow for RLF recovery procedures. In some aspects, both options may be applied together or individually. For instance, option one to be applied first to alert child node relays while option two may be applied with some delay, e.g., after the RLF recovery procedure has failed. In some aspects, these options may be staggered differently after RLF discovery then after reception of a backhaul failure alert message from a parent node (e.g., from an upstream backhaul device).

Accordingly, a relay device may detect an upstream RLF associated with an upstream link in the wireless backhaul network. For example, the relay device may detect an upstream RLF associated with the first wireless link between the relay device and a first upstream backhaul device. As another example, the relay device may receive an indication (e.g., a second indication) of an upstream RLF from the first upstream backhaul device. Based on detecting the upstream RLF, the relay device made provide a first indication (e.g., a first indication) of the upstream RLF over a second wireless link between the relay device and a first downstream device. Generally, the indication may be a backhaul RLF alert message (which may also be referred to as a backhaul RLF (BH-RLF)-alert message that is provided to each child node (e.g., each device that is downstream from the relay device, such as child relay devices and/or UEs). The relay device may then establish a third wireless link with the second upstream backhaul device in response to the upstream RLF. For example, the relay device may transmit one or more messages (e.g., radio resource control (RRC) messages, medium access control (MAC) messages, and the like) and/or may monitor one or more channels to detect a new path to an anchor device. The relay device may establish the third wireless link with the second upstream backhaul device and provide multiple access services to one or more downstream devices. Generally, the multiple access services may include access services (e.g., such as with one or more downstream UEs) and/or backhaul services (e.g., such as with one or more downstream relay devices). The multiple access services may be provided based on backhaul communications between the relay device and the second upstream backhaul device over the third wireless link.

A method of wireless communications at a relay device is described. The method may include detecting an upstream RLF associated with an upstream link of a wireless backhaul, where the wireless backhaul includes a first wireless link between the relay device and a first upstream backhaul device, providing a first indication of the upstream RLF over a second wireless link between the relay device and a first downstream device, establishing a third wireless link with a second upstream backhaul device based on the detected upstream RLF, and providing multiple-access services to one or more downstream devices, where providing the multiple-access services is based on backhaul communications between the relay device and the second upstream backhaul device over the third wireless link.

An apparatus for wireless communications at a relay device is described. The apparatus may include a processor, memory in electronic communication with the processor, and instructions stored in the memory. The instructions may be executable by the processor to cause the apparatus to detect an upstream RLF associated with an upstream link of a wireless backhaul, where the wireless backhaul includes a first wireless link between the relay device and a first upstream backhaul device, provide a first indication of the upstream RLF over a second wireless link between the relay device and a first downstream device, establish a third wireless link with a second upstream backhaul device based on the detected upstream RLF, and provide multiple-access services to one or more downstream devices, where providing the multiple-access services is based on backhaul communications between the relay device and the second upstream backhaul device over the third wireless link.

Another apparatus for wireless communications at a relay device is described. The apparatus may include means for detecting an upstream RLF associated with an upstream link of a wireless backhaul, where the wireless backhaul includes a first wireless link between the relay device and a first upstream backhaul device, providing a first indication of the upstream RLF over a second wireless link between the relay device and a first downstream device, establishing a third wireless link with a second upstream backhaul device based on the detected upstream RLF, and providing multiple-access services to one or more downstream devices, where providing the multiple-access services is based on backhaul communications between the relay device and the second upstream backhaul device over the third wireless link.

A non-transitory computer-readable medium storing code for wireless communications at a relay device is described. The code may include instructions executable by a processor to detect an upstream RLF associated with an upstream link of a wireless backhaul, where the wireless backhaul includes a first wireless link between the relay device and a first upstream backhaul device, provide a first indication of the upstream RLF over a second wireless link between the relay device and a first downstream device, establish a third wireless link with a second upstream backhaul device based on the detected upstream RLF, and provide multiple-access services to one or more downstream devices, where providing the multiple-access services is based on backhaul communications between the relay device and the second upstream backhaul device over the third wireless link.

In some examples of the method, apparatuses, and non-transitory computer-readable medium described herein, detecting the upstream RLF may include operations, features, means, or instructions for receiving, from the first upstream backhaul device on the first wireless link, a second indication of the upstream RLF, where the second indication of the upstream RLF is received before providing the first indication of the upstream RLF. In some examples of the method, apparatuses, and non-transitory computer-readable medium described herein, the first indication may include operations, features, means, or instructions for an identifier of a wireless link associated with the upstream RLF, or an identifier of an upstream backhaul device that initially detected the upstream RLF. Some examples of the method, apparatuses, and non-transitory computer-readable medium described herein may further include operations, features, means, or instructions for descrambling a signal carrying the second indication using a defined scrambling sequence, where successfully descrambling the signal includes detecting the upstream RLF.

Some examples of the method, apparatuses, and non-transitory computer-readable medium described herein may further include operations, features, means, or instructions for configuring the first indication of the upstream RLF to include an identifier of a wireless link associated with the upstream RLF, or an identifier of an upstream backhaul device that initially detected the upstream RLF, or a combination thereof.

In some examples of the method, apparatuses, and non-transitory computer-readable medium described herein, and receiving a third indication of an available backhaul connection from one or more of: the first downstream device or a second downstream device, where the third wireless link may be based on the available backhaul connection.

In some examples of the method, apparatuses, and non-transitory computer-readable medium described herein, establishing the third wireless link may include operations, features, means, or instructions for transmitting an RRC message to the second upstream backhaul device. In some examples of the method, apparatuses, and non-transitory computer-readable medium described herein, the RRC message may include operations, features, means, or instructions for an RRC connection complete message, or an RRC connection resume message, or an RRC connection reestablishment.

Some examples of the method, apparatuses, and non-transitory computer-readable medium described herein may further include operations, features, means, or instructions for emptying a downlink buffer storing data for the first downstream device by transmitting the data over the second wireless link after detecting the upstream RLF. Some examples of the method, apparatuses, and non-transitory computer-readable medium described herein may further include operations, features, means, or instructions for receiving an uplink scheduling request from the first downstream device and rejecting the uplink scheduling request based on the detected upstream RLF.

In some examples of the method, apparatuses, and non-transitory computer-readable medium described herein, providing the first indication of the upstream RLF may include operations, features, means, or instructions for scrambling a signal using a defined scrambling sequence based on the detecting the upstream RLF. In some examples of the method, apparatuses, and non-transitory computer-readable medium described herein, the signal may include operations, features, means, or instructions for a synchronization signal, a reference signal, a tracking reference signal, a position reference signal, or a beam management reference signal.

In some examples of the method, apparatuses, and non-transitory computer-readable medium described herein, detecting the upstream RLF may include operations, features, means, or instructions for performing radio link monitoring of the first wireless link between the relay device and the first upstream backhaul device and determining, based on the radio link monitoring, that a performance metric of the first wireless link fails to satisfy a threshold performance metric. In some examples of the method, apparatuses, and non-transitory computer-readable medium described herein, and transmitting a configuration signal to one or more of: the first downstream device or a second downstream device, where the configuration signal may be configured to increase a frequency with which the first downstream device or the second downstream device performs channel measurements.

In some examples of the method, apparatuses, and non-transitory computer-readable medium described herein, detecting the upstream RLF may include operations, features, means, or instructions for determining that an out-of-synchronization condition may have occurred for the first wireless link between the relay device and the first upstream backhaul device. In some examples of the method, apparatuses, and non-transitory computer-readable medium described herein, detecting the upstream RLF may include operations, features, means, or instructions for determining that a beam failure event may have occurred for a beam being used for the first wireless link between the relay device and the first upstream backhaul device.

In some examples of the method, apparatuses, and non-transitory computer-readable medium described herein, the at least one downstream device may include operations, features, means, or instructions for a downstream relay node, or a user equipment. In some examples of the method, apparatuses, and non-transitory computer-readable medium described herein, the third wireless link includes at least one of a configured wireless link, an inactive wireless link, or a new wireless link.

In some examples of the method, apparatuses, and non-transitory computer-readable medium described herein, providing the first indication of the upstream RLF may include operations, features, means, or instructions for suspending transmission of one or more radio channels of the second wireless link. Some examples of the method, apparatuses, and non-transitory computer-readable medium described herein may further include operations, features, means, or instructions for reestablishing transmission of the one or more radio channels over the second wireless link upon establishment of the third wireless link between the relay device and the second upstream backhaul device. Some examples of the method, apparatuses, and non-transitory computer-readable medium described herein may further include operations, features, means, or instructions for starting a timer upon detecting the upstream RLF and suspending transmission of the one or more radio channels upon expiry of the timer. In some examples of the method, apparatuses, and non-transitory computer-readable medium described herein for the radio channels to include a synchronization channel, a reference signal channel.

In some examples of the method, apparatuses, and non-transitory computer-readable medium described herein, the first downstream device includes the second upstream backhaul device. In some examples of the method, apparatuses, and non-transitory computer-readable medium described herein, the first downstream device may be different from the second upstream backhaul device. In some examples of the method, apparatuses, and non-transitory computer-readable medium described herein, the first upstream backhaul device includes the second upstream backhaul device. In some examples of the method, apparatuses, and non-transitory computer-readable medium described herein, the first upstream backhaul device may be different from the second upstream backhaul device.

In some examples of the method, apparatuses, and non-transitory computer-readable medium described herein, a base station function of the relay device manages communications the first wireless link and the third wireless link, and a user equipment-function of the relay device manages communications of the second wireless link. In some examples of the method, apparatuses, and non-transitory computer-readable medium described herein, one or more of the first wireless link, or the second wireless link, or the third wireless link include a cellular wireless link.

In some examples of the method, apparatuses, and non-transitory computer-readable medium described herein, the first indication of the upstream RLF is transmitted on one or more of: a MAC layer message, or a layer-2 sublayer message, or an RRC message, or an F1-application layer message.

In some examples of the method, apparatuses, and non-transitory computer-readable medium described herein, the third wireless link may be associated with a first anchor device and the first wireless link may be associated with a second anchor device, the first anchor device being different from the second anchor device. In some examples of the method, apparatuses, and non-transitory computer-readable medium described herein, the third wireless link and the first wireless link may be associated with a first anchor device.

In some examples of the method, apparatuses, and non-transitory computer-readable medium described herein, providing the first indication of the upstream RLF may include operations, features, means, or instructions for performing one or more of: a unicast transmission, or a multi-cast transmission, or a broadcast transmission. In some examples of the method, apparatuses, and non-transitory computer-readable medium described herein, the first and/or second indication of the upstream RLF includes an RLF backhaul alert message.

DETAILED DESCRIPTION

Figure 1:
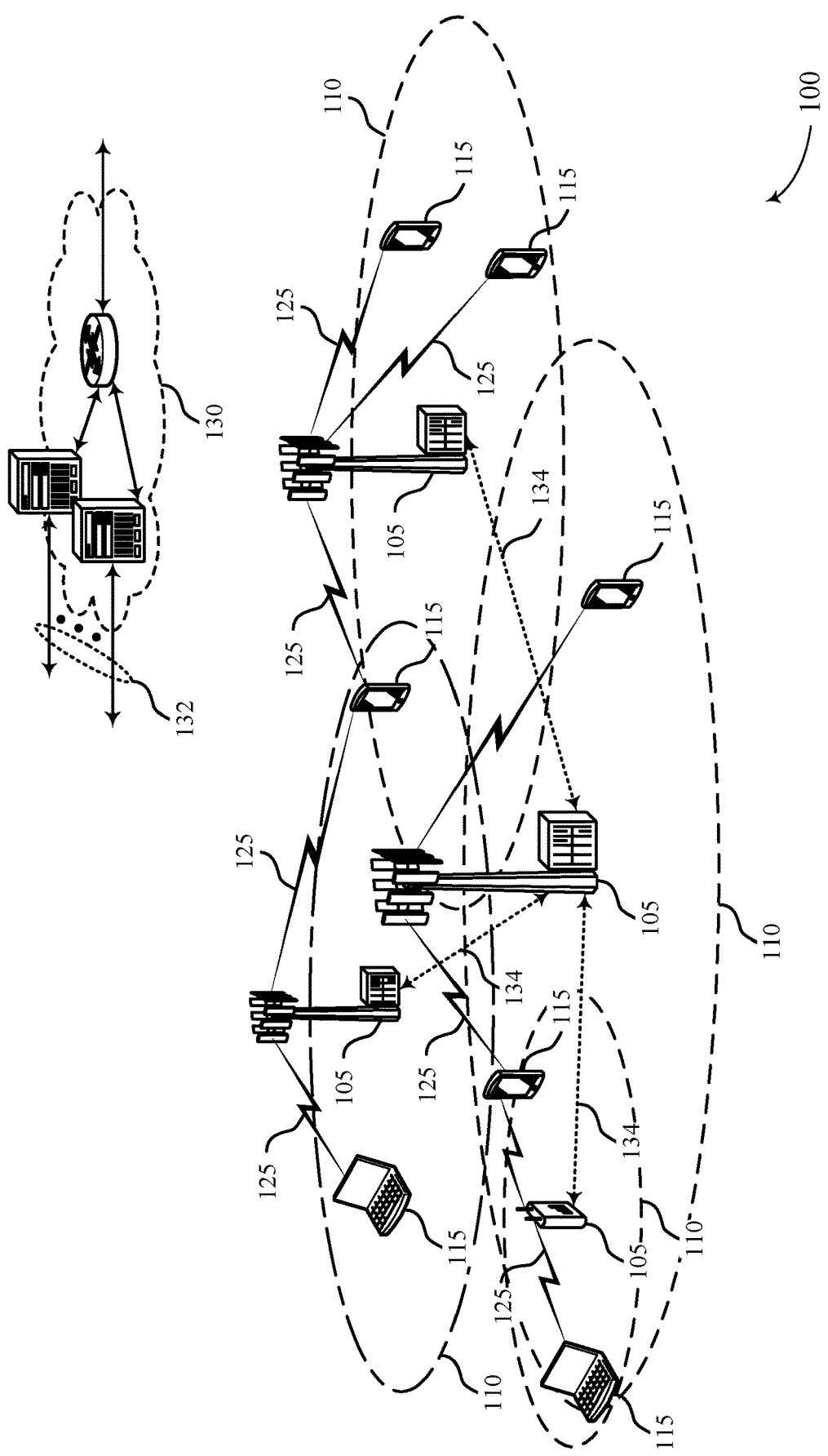
FIG. 1 illustrates an example of a wireless communications system that supports management of radio link failure (RLF) in wireless backhaul in accordance with aspects of the present disclosure.

Some wireless communications systems may operate in millimeter wave (mmW) frequency ranges (e.g., 28 gigahertz (GHz), 40 GHz, 60 GHz, etc.). In some cases, wireless communications at these frequencies may be associated with increased signal attenuation (e.g., path loss), which may be influenced by various factors, such as temperature, barometric pressure, diffraction, etc. As a result, signal processing techniques such as beamforming (e.g., directional transmission) may be used to coherently combine signal energy and overcome the path loss in specific beam directions. In some cases, a device may select an active beam for communicating with a network by selecting the strongest beam from among a number of candidate beams.

Some wireless communications systems may utilize backhaul communications for various functions. Generally, the backhaul communications may include signals being exchanged between a base station and a core network, between base stations, between a base station and the relay device, between relay devices, and the like. Some wireless communications systems may be configured such that each base station has a wireline connection to the network, such as a fiber link or some other high-speed connection to the network. Some wireless communications may alternatively be configured such that not every base station has a wireline connection to the network. For example, one, two, three, or some other number of the nodes within the network may have a wireline connection to the network. Such nodes may be considered anchor devices within the wireless backhaul network from the perspective of downstream devices. The other nodes in the wireless network may connect to the anchor devices directly or through one or more relay devices. For example, downstream nodes may connect to one or more upstream nodes (e.g., with each connection or wireless link may be considered a hop), with the upstream nodes eventually leading or connecting to an anchor device. One example of such wireless networks may include an Integrated Access and Backhaul (IAB) network. Conventionally, a central unit manages one or more aspects of the wireless links or inter-connectivity between the nodes in the wireless backhaul network. However, in some instances a wireless link may suddenly become unavailable or otherwise unacceptable for use within the network. Such events may be considered a radio link failure (RLF) and may result in the downstream nodes suddenly losing their connection to the anchor device. This may result in a loss of communications, increase latency, consume additional over-the-air resources, and the like, for the wireless backhaul network.

Aspects of the disclosure are initially described in the context of a wireless communications system. In some aspects, wireless communications systems may be configured to support improved detection and recovery in the event of an RLF in a wireless backhaul network. In some aspects, this may include each node (e.g., each relay device) operating within the wireless backhaul network monitoring for an RLF and, when detected, transmitting a first indication of the RLF to one or more of the downstream devices. For example, the relay device may monitor link quality using radio link monitoring techniques and determine that the wireless link suddenly becomes unavailable (e.g., such as due to blocking) or otherwise unacceptable for use (e.g., when the performance metrics of the wireless link fails to satisfy a threshold). In another example, the relay device may detect the upstream RLF based on receiving a second indication of the upstream RLF from one of its upstream backhaul devices. In response, the relay device may provide a first indication of the upstream RLF to downstream device(s). The first indication may be explicit or implicit. The first indication may be provided using one or more signals/message, based on scrambling certain signals/channels, based on the suspension of certain radio channels, and the like. The relay device may then establish a third wireless link with a second upstream backhaul device and provide multiple-access services to downstream device(s). The multiple-access services may be provided based on backhaul communications between the relay device and the second upstream backhaul device over the third wireless link.

Aspects of the disclosure are further illustrated by and described with reference to apparatus diagrams, system diagrams, and flowcharts that relate to management of RLF in wireless backhaul.

FIG. 1 illustrates an example of a wireless communications system 100 that supports management of RLF in wireless backhaul in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, cellular radio access technologies (RATs), such as mmW-based RATs, may be used to support access traffic between UEs 115 and base stations 105, in addition to backhaul and access traffic among multiple base stations 105. Moreover, both access and backhaul traffic may share the same resources (e.g., as in the case of integrated access and backhaul (IAB)). Such wireless backhaul or IAB solutions may be increasingly beneficial with the evolution of cellular technologies due to enhancements in wireless link capacity and reduction in latency. Further, the use of wireless backhaul links may reduce the cost of dense small cell deployments. Thus, using a mmW RAT may enable wireless backhaul communication using one or more node functions at a wireless node, such as a base station 105, an access node, or UE 115.

In some aspects, a relay device (e.g., which may be an example of a base station 105 and/or a UE 115) may detect an upstream RLF associated with an upstream link of a wireless backhaul, where the wireless backhaul includes a first wireless link between the relay device and a first upstream backhaul device. The relay device may provide a first indication of the upstream RLF over a second wireless link between the relay device and a first downstream device. The relay device may establish a third wireless link with a second upstream backhaul device based on the detected upstream RLF. The relay device may provide multiple-access services to one or more downstream devices, where providing the multiple-access services is based on backhaul communications between the relay device and the second upstream backhaul device over the third wireless link.

Figure 2A:
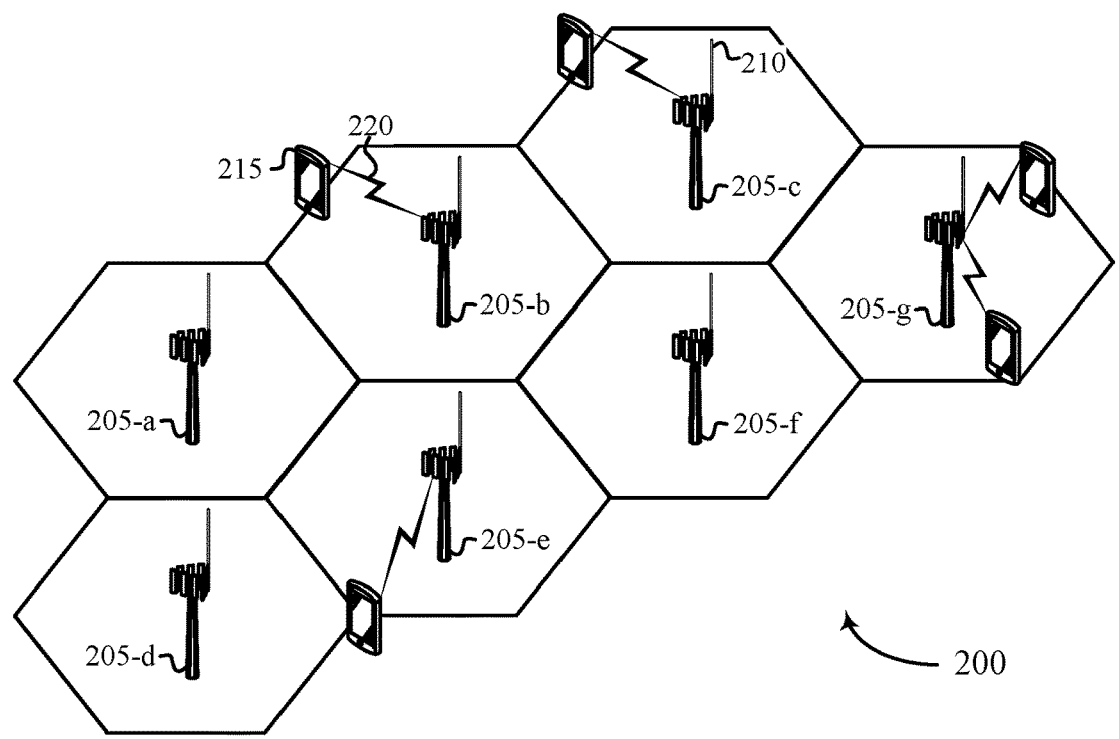
FIGS. 2A and 2B illustrate examples of a wireless communications system that supports management of RLF in wireless backhaul in accordance with aspects of the present disclosure.
Figure 2B:
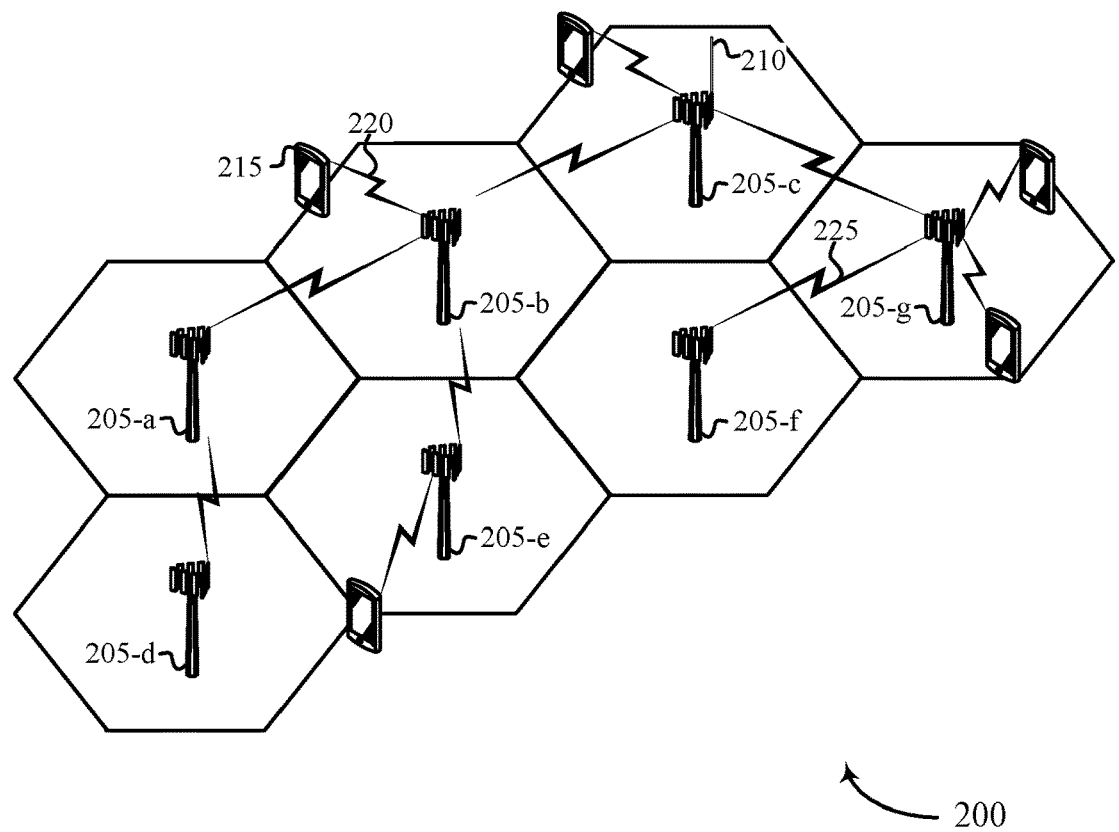

FIGS. 2A and 2B illustrate examples of a wireless communications system 200 that supports management of RLF in wireless backhaul in accordance with aspects of the present disclosure. In some examples, wireless communications system 200 may implement aspects of wireless communications system 100. In some examples, wireless communications system 200 may be an example of a mmW network. Generally, wireless communications system 200 may include a plurality of base stations 205 and UEs 215, which may be examples of corresponding devices described herein.

Some wireless communications systems may provide multiple access services. For example, multiple access services may include access services (e.g., between a UE 215 and a base station 205) and/or backhaul services (e.g., between a base station 205 and a core network and/or between base stations 205). However, wireless networks may be configured differently. As illustrated in the example of FIG. 2A, each base station 205 may be configured such that is has its own fiber point 210 connecting the base station 205 to the Internet or core network. In this configuration, each UE 215 is provided access services over wireless link 220 by a corresponding base station 205. As one non-limiting example illustrated in FIG. 2, base station 205-b may provide access services to UE 215 over wireless link 220. Thus, in FIG. 2A, each base station 205 manages its own backhaul operations using its fiber point 210 in connection with a central function of the core network.

However, in some examples wireless networks are configured such that not every base station 205 has its own fiber point 210. As is illustrated in the example of FIG. 2B, only base station 205-c has a fiber point 210. The other base stations 205 (e.g., base stations 205-a, 205-b, and 205-d through 205-g may connect to the Internet or core network via a wireless link 225 established between each base station 205. Generally, each wireless link 225 between base stations 205 may be considered a hop within a wireless backhaul network, where the total number of hops between a base station 205 and a fiber point 210 (which may also be considered an anchor device in this context) is dependent upon the number of wireless links 225. For example, base station 205-a has two hops to get to the nearest anchor device, e.g., the first hop from base station 205-a to base station 205-b, and a second hop from base station 205-b to base station 205-c. Of course each base station 205 may also provide access services over wireless link 220 to any UEs 215 within its coverage area. Generally, wireless links 220 and/or 225 may be cellular or non-cellular links, may be Wi-Fi or non-Wi-Fi wireless links, may be sub-6 GHz links or mmW wireless links, etc.

Multi-hop wireless backhaul networks, e.g., using mmW technology, enables flexible and lower cost deployments of small cells. In some aspects, mmW technologies are well suited for extended wireless backhaul networks due to their support of narrow antenna beams, which highly reduces inter-link interference. Multi-hop wireless backhauling is also important for the rollout of mmW RATS. Due to the limited range of wireless links 220 used for mmW-based access, mmW cells (e.g., base stations 205) are inherently small in nature. To provide sufficient availability of wireless links 220 for mmW-based access to end users (e.g., UEs 215), highly densified small-cell deployments may be used. The rollout of such highly densified networks may create a backhaul problem. Since mmW-based RAT offers high link capacity, it is possible to integrate wireless links 220 for access with wireless links 225 for backhaul and let mmW base stations 205 backhaul their own access traffic (such as is shown in FIG. 2B).

As discussed above, multi-hop wireless backhaul networks can also be formed using sub-6 GHz frequencies. It is possible, for instance, to use massive-MIMO-based technologies to improve spectral efficiency. In some aspects, wireless communications system 200 may support defining a one-hop backhaul solution using a cellular RAT, which allows the relay device (e.g., base stations 205) to autonomously connect to a donor device (such as an upstream backhaul device), similar to how UE 215 connects to a base station 205. In some aspects, this may be extended to a L3 multi-hop solution, to a L2 routing solution over cellular interfaces which can be used to establish a L2 multi-hop solution.

Wireless backhaul links (e.g., wireless links 225) are subject to RLF, e.g., due to moving obstructions such as vehicles (trucks, etc.), seasonal foliage changes, etc. In some aspects, this problem may be exacerbated for mmW-based RATs since mmW frequencies are subject to high penetration loss and limited diffraction around obstacles. The problem is further exacerbated for multi-hop topologies, where each hop (each wireless link 225) becomes a potential failure point. Further, an RLF at a wireless link 225 used for backhaul affects all base stations 205 (e.g., each downstream relay device and/or UE 215) that are in the downstream direction from the failed wireless link 225.

Generally, an RLF may refer to a measurement procedure that determines that a radio link (e.g., wireless link 225) has failed or that the radio link has deteriorated below a certain acceptable level. In some aspects, and RLF may refer to the detection of an out-of-synchronization condition over the wireless link 225, a beam failure over the wireless link 225, and the like.

However, aspects of the described techniques provide a mechanism to detect and/or recover from an RLF condition in such a wireless network. Broadly, this may include, on the wireless backhaul link, a relay device monitoring the link quality and/or listening for an RLF backhaul alert message. Generally, an RLF backhaul alert message may refer to an indication of an upstream RLF. Upon detecting an RLF or receiving an RLF backhaul alert message, the relay device (e.g., base stations 205, or UE 215 when acting as a backhaul device in other deployments) may undergo recovery procedures by connecting to an alternative parent relay, e.g., by using forward handover and/or by activating a redundant link it already has with another parent relay. If these attempts fail, or if there is no redundant path or alternative parent that is available, the relay device may transmit a backhaul failure alert message to child relays and potentially also to UEs (e.g., to allow the child relays and/or UEs to find a new attachment point) and/or to suspend physical channels and signals (e.g., such as synchronization signals, reference signals, and the like). Suspending transmission of the physical channels and signals may result in the child relays and/or UEs detecting an RLF condition, and therefore initiating their own RLF recovery procedures. In some aspects, these options may be applied together and/or separate. For example, first option may be applied first to alert child relays and/or UEs while option two may be applied after some delay, e.g., after the RLF recovery procedures has failed. Moreover, these options may be staggered differently after detecting the RLF than after reception of a backhaul failure alert message from a parent node (e.g., an indication of an upstream RLF from a first upstream backhaul device).

More particular, the relay device may detect or otherwise determine that an RLF has occurred for an upstream wireless link that is one or more hops away in a wireless backhaul network (e.g., such as is illustrated in the example of FIG. 2B). In this example, each wireless link 225 may be an example of a wireless link between the relay device and the first upstream backhaul device (e.g., a wireless link 225 between a base station 205-*a* and base station 205-*b*). The relay device may detect or otherwise determine that the upstream RLF has occurred either by monitoring its own wireless link between itself and its first upstream backhaul device and/or by receiving a backhaul RLF alert message from its first upstream backhaul device.

Upon detecting the upstream RLF, the relay device may provide a first indication of the upstream RLF over a wireless link between the relay device and one or more downstream devices associated with the relay device (e.g., one or more downstream relay devices and/or UEs 215). In some aspects, the indication may be provided explicitly and/or implicitly. One example of an explicit indication may include the relay device transmitting a signal conveying the indication of the upstream RLF over the wireless link between the relay device and its downstream device. One example of an implicit indication may include the relay device suspending one or more services or radio channels to the downstream device and/or scrambling one or more signals in response to the detected upstream RLF.

In some aspects, the first indication may be provided using scrambling techniques. For example, a signal carrying the indication (e.g., the backhaul RLF alert message) may be scrambled using a particular or defined scrambling sequence. Scrambling the signal using the defined scrambling sequence may provide the indication that the upstream RLF has occurred. In some aspects, any of the described techniques for providing the indication may be used for detecting the upstream RLF by the relay device (e.g., when the relay device detects the upstream RLF by receiving an indication from its first upstream device) and/or when providing a first indication of the detected upstream RLF to downstream device(s).

In some aspects, the first indication may be configured so as to provide a first indication of the relay device that detected the upstream RLF (e.g., one or more upstream relay devices) and/or an indication of the wireless link experiencing the upstream RLF. In some aspects, the first indication provides a mechanism for downstream devices that enables them to more quickly detect an upstream RLF and respond by establishing a new wireless link with an upstream backhaul device, such as is being performed by the relay device.

In some aspects, the relay device may establish a new wireless link with a second upstream backhaul device and provide multiple access services to one or more downstream devices. The multiple access services may include access services provided to UEs 215 over wireless links 220 and/or backhaul services provided over wireless links to 225 to downstream relay devices (e.g., downstream base stations 205). Accordingly, wireless communications system 200 is configured to support detecting and responding to the detection of an upstream RLF in the wireless backhaul network.

Figure 3:
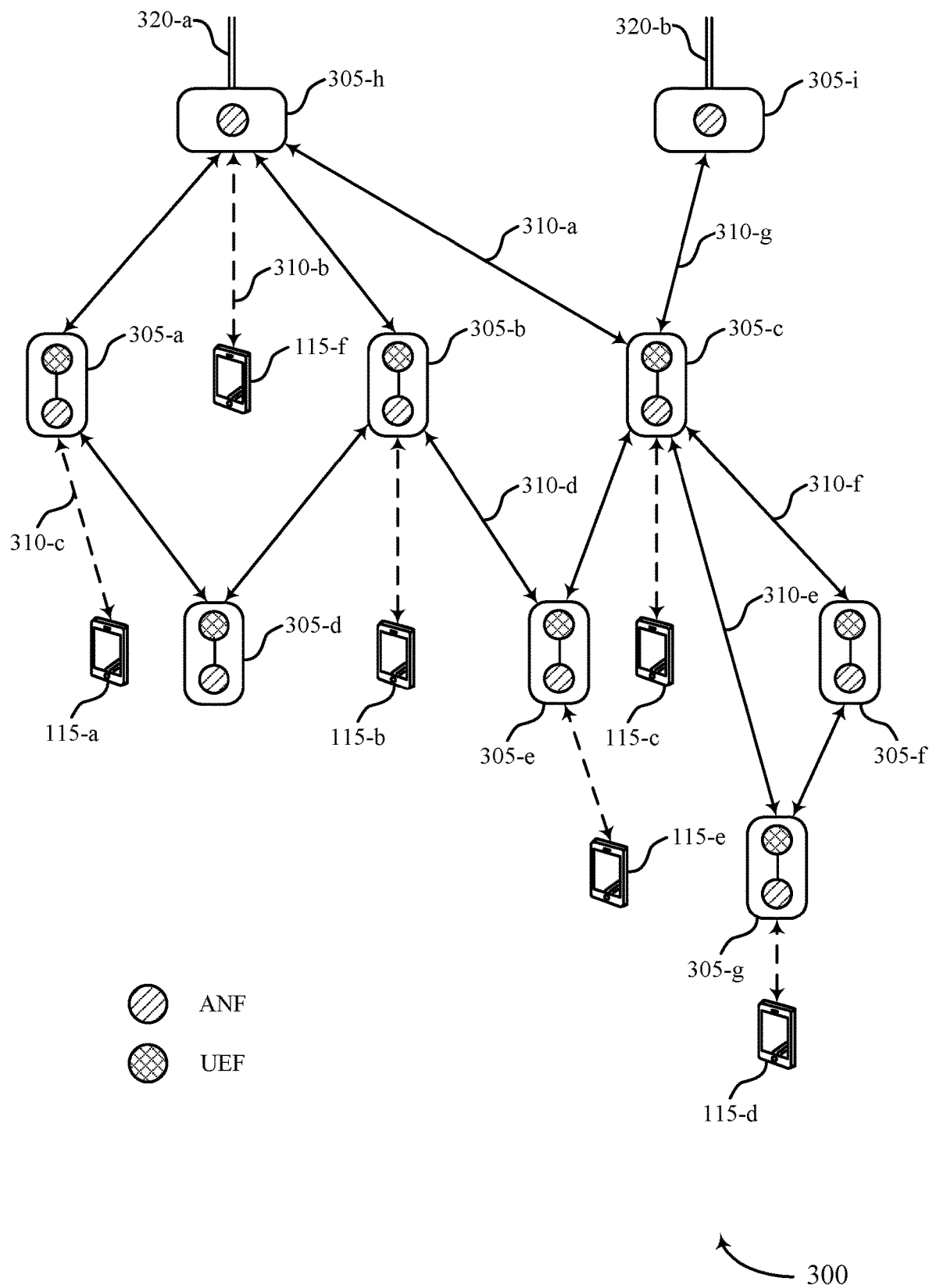
FIG. 3 illustrates an example of a wireless communications system that supports management of RLF in wireless backhaul in accordance with aspects of the present disclosure.

FIG. 3 illustrates an example of a wireless communications system 300 that supports management of RLF in wireless backhaul in accordance with aspects of the present disclosure. In some examples, wireless communications system may implement aspects of wireless communications systems 100/200. In some cases, the wireless communications system 300 may be an example of a wireless communications network that operates in mmW spectrum, or supports 5G NR deployments.

In some wireless communications systems, such as those deploying NR technologies, wireless backhaul links may be used to couple an access nodes (ANs) 305 to a network in place of a high-capacity, wired backhaul link (e.g., fiber). For example, a first AN 305 (e.g., a relay node or device) in communication with a UE 115, or another AN 305, may establish a backhaul link (wired or wireless) with a second AN 305 (e.g., anchor node or device), which has a high-capacity, wired backhaul link to the network. In this manner, the first AN 305 may communicate access traffic from the UE 115 (or another AN 305) to the network via the second AN 305 through the combination of the one or more backhaul wireless links. In some examples, a backhaul network may use multiple backhaul wireless links before reaching a wired backhaul link. The first AN 305 may be referred to as a UE-function (UEF) with respect to the anchor AN 305 and an Access Node Function (ANF) with respect to the UE (or another AN 305) with which the first AN 305 is communicating. Thus, a relay device may act as a UE for its one or more parent relays (e.g., upstream backhaul devices, which may also be considered relays that connect the relay device one hop closer to the anchor) and as a base station for its child relays and/or UEs (e.g., one or more downstream devices) within its coverage area.

In some aspects, wireless communications system 300 may include a number of ANs 305 (such as ANs 305-*a*, 305-*b*, 305-*c*, etc.) and UEs 115 that communicate over a combination of wired links 320 (e.g., wired links 320-*a* and 320-*b*, which may be fiber links in some examples) that connect the wireless backhaul network to the core network/Internet and wireless links 310. In some cases, the wired links 320 may be core network links, and may connect anchor ANs 305-*h* and 305-*i* to the core network (e.g., core network 130 of FIG. 1). The ANs 305 may be examples of the relay device, upstream backhaul devices, downstream devices, and/or anchor devices, as is described herein and dependent upon the context.

In some examples, complex backhaul topologies may be handled by composing the topology from multiple stars that mutually overlap. For instance, wireless communications system 300 may include a mesh topology with at least two interfaces to a wireline network. Additional ANs 305 may be either directly or indirectly coupled to the respective interfaces of the mesh topology via wireless links 310 (e.g., wireless link 310-*a*). Such a topology may include multiple stars, where some stars mutually overlap. An ANF may be supported by an AN 305 of the mesh topology (e.g., ANs 305-*b*, 305-*h*, 305-*i*, etc.). UEF functionality may be configured at some or all of the ANs 305 of the wireless communications system 300. As a result, an AN 305 may include multiple ANFs and/or UEFs configured for uplink and downlink data packet transmission using the node functions.

In some cases, each of the one or more wireless links 310 may be associated with wireless resources, used for establishing resource functionality for access and backhaul traffic (e.g., multiple-access services) within the mesh topology, and the like. For example, AN 305-*b* may include one or more instances of a UEF, where it may communicate with the ANFs at ANs 305-*h*, 305-*d*, and 305-*e*. In some cases, ANs 305 may each communicate with each other using at least one ANF and at least one UEF, and may form overlapping stars. In some aspects, each AN 305 may further include a relay functionality, where a given AN 305 may relay transmissions between ANs 305, for example, from a UE 115 to another AN 305, such as AN 305-*e* supporting communication between the network and UE 115-*e* via AN 305-*b*.

Additionally or alternatively, mobile access may be integrated at one or more ANs 305. Each AN 305 of the integrated mobile access may be configured to form a star topology with UEs 115. For example, AN 305-*a* may correspond to a center of a star topology of integrated mobile access within the network. One or more UEs 115-*a* may be coupled to AN 305-*a* via one or more wireless links (e.g., wireless link 310-*c*). In some examples, mobile access links may also be added to existing stars. In an example, AN 305-*c* may communicate with AN 305-*h* using wireless link 310-*a*. AN 305-*g* may further communicate with UE 115-*d* and AN 305-*c* over wireless links 310 (e.g., wireless link 310-*e*). In this example, wireless links 310-*a* and 310-*e* may use the same or different wireless resources and/or RAT to provide support for IAB. In some cases, a range of ANF and UEF combinations may be instantiated in an AN 305. Additionally, different combinations of UEF and ANF instances in ANs 305, as well as different topologies not shown in FIG. 3, may be possible.

The ANF and UEF configurations of the ANs 305 may monitor, control, or otherwise manage one or more aspects of the described techniques for RLF detection and recovery within wireless communications system 300. That is, wireless communications system 300 illustrates one example of a wireless backhaul topology consisting of relay devices that interconnect via wireless backhaul links. The topology is connected to a wireline network via anchor devices (e.g., via AN 305-*h* and/or 305-*i*). The relay devices and the ANs 305 may further allow or otherwise support attachment of mobile devices, such as UEs 115. The relay devices may perform relaying on layer 2, relaying on layer 3, or any other protocol layer. In some aspects, the relay device (e.g., AN 305) may also be referred to as a donor node or an IAB donor node.

In some aspects, the wireless network topology of wireless communications system 300 may have a hierarchical structure such as a spanning tree topology or a directed acyclic graft topology. In some aspects, each backhaul link may hold or otherwise be instantiated as, the ANF (e.g., a base station function), or as part of a base station function such as a gNB or base station distributed unit (DU) at one backhaul link endpoint and a mobile terminal function (e.g., UEF) on the other backhaul link endpoint. In such arrangements, the backhaul link supporting the base station function may control resource access and broadcast synchronization signals in system information, while the other backhaul link endpoint (e.g., holding the mobile terminal function) may follow control commands by the base station function of the upstream backhaul link endpoint. In some aspects, the advantage of such an arrangement is at the base station function residing on the relay device can also support access links to UEs 115. Moreover, the features developed for access links can be reused for backhaul wireless links. In particular, radio link monitoring features typically applied to UEs 115 on access links may also be used by relay devices (e.g., ANs 305) for backhaul link monitoring. Accordingly, procedures for the determination of link deterioration and/or RLF applied by UEs 115 on access links may also be applied by relay devices for backhaul wireless links.

In some aspects, the UEF residing on a relay device may have backhaul links to multiple ANF. In some aspects, the UEF residing on a relay device may have backhaul links to multiple ANFs through multiple UEFs. While a plurality of these backhaul wireless links may be simultaneously active, it is also possible that only one or a few are active while the others are used for backup purposes, e.g., configured in an inactive state or otherwise identified as a backup backhaul connection.

In some aspects, wireless communications system 300 may be configured to align the link asymmetry with the wireless backhaul topology such that the ANF of a backhaul link resides closer to the anchor device and the UEF resides further away from the anchor device. This may support the finding a parent node for each relay device, which may be another relay device or an anchor device. Each relay device may further have one or more child relay devices. Relay devices may be connected to multiple parent devices via one or more UEFs instantiated on the relay device. In the same manner, the relay device or anchor device may be connected to multiple child relay devices via its ANFs. In some aspects, aligning the backhaul links with the wireless backhaul topology may provide an advantage that existing access procedures, such as handover, multi-connectivity, and link recovery, after an RLF event can be reduced for backhaul links.

For example, one or more of the ANs 305 may be acting as a relay device (e.g., AN 305-*b*) in a wireless backhaul network by providing multiple access services to one or more downstream devices (e.g., ANs 305-*d*, AN 305-*e*, UE 115-*b*) based on backhaul communications between the relay device and an upstream backhaul device (e.g., between AN 305-*b* and 305-*h*). The relay device may be providing multiple access services via a wireless link between the relay device and the upstream backhaul device. Generally, the multiple access services may include backhaul communications between the relay device and AN 305-*d*, 305-*e*, and AN 305-*h* and/or access links between relay device and UE 115-*b*.

In some aspects, the relay device may detect an upstream RLF associated with an upstream link of the wireless backhaul network. For example, the relay device may detect the upstream RLF using radio link monitoring of the wireless link between the relay device and the upstream backhaul device (e.g., between AN 305-*b* and AN 305-*h*). The relay device may determine that performance metric of the wireless link between the relay device and the upstream a call device has deteriorated to the point where it fails to satisfy a threshold level. In other aspects, relay device may detect the upstream are left based on receiving an indication of the upstream are left from the upstream backhaul device. For example, the upstream backhaul device may detect or otherwise determine that there is an RLF in in a wireless link one or more hops above the upstream backhaul device, and therefore transmit the indication of the upstream RLF.

In some aspects, the relay device may determine that an out of synchronization condition as occurred for the wireless link between the relay device in the first upstream backhaul device. For example, the relay device may determine that the degree of synchronization between the relay device and the upstream backhaul device has deteriorated below an acceptable level, and therefore determine that this constitutes an upstream RLF.

In some aspects, the upstream RLF may be determined based on the performance of one or more beams associated with a corresponding wireless link. For example, in a mmW network the wireless link used for the backhaul communications may utilize beamformed transmissions. One or more of the beamformed signals may deteriorate (e.g., due to blocking, mobility, and the like) to a point where the beam is no longer acceptable to support the backhaul communications. Based on the beam failure event, the relay device may determine that this constitutes the upstream RLF.

In some aspects, upon detecting the upstream RLF the relay device may empty the downlink buffers storing data for associated downstream device(s). For example, the relay device may transmit the data over the corresponding wireless link between the relay device and the downstream device(s). In some aspects, based on detecting the upstream RLF the relay device may also reject any scheduling request received from downstream device(s). For example, the relay device may receive an uplink scheduling request from one or more of the downstream devices and reject the uplink scheduling request in response to the upstream RLF.

Based on detecting the upstream RLF, the relay device may provide a first indication of the upstream RLF over a wireless link between the relay device and one or more downstream devices. For example, AN 305-*b* may provide a first indication of the upstream RLF over a first wireless link to AN 305-*d*, over a second wireless link to UE 115-*b*, and/or over a third wireless link to AN 305-*e*. In some aspects, the indication (whether being provided by the relay device, such as the first indication, or received at the relay device, such as the second indication, from an upstream backhaul device) may be configured to provide various information. For example, the indication may be configured to indicate or otherwise identify the wireless link experiencing the RLF, the AN 305 that initially detected the RLF, and the like. In some examples, the indication of the upstream RLF may be provided in a MAC layer message, a layer 2 sub layer message, an RRC message, and F1-application layer message, and the like.

In some aspects, the indication (again, whether being provided by the relay device or received at the relay device from an upstream backhaul device) may be conveyed using various scrambling techniques. For example, a known or otherwise defined scrambling sequence may be used to scramble a signal carrying the indication of the upstream RLF. Scrambling this signal may serve to convey the indication that the upstream RLF has occurred. Examples of the signal that may be scrambled according to the described techniques include, but are not limited to, a synchronization signal, a reference signal, a tracking reference signal, a positioning reference signal, a beam management reference signal, and the like.

In some aspects, the indication (again, whether being provided by the relay device or received at the relay device from an upstream backhaul device) may be provided based on the relay device suspending transmission of certain radio channels between the relay device and the corresponding downstream device(s). For example, upon detecting the upstream RLF the relay device may initiate a timer that has a predetermined duration. Upon the expiration of the timer, the relay device may suspend transmission of the radio channels. Examples of the radio channels that may be suspended to provide or otherwise signal the indication of the upstream RLF include, but are not limited to, synchronization signal channels, reference signal channels, broadcast signals, system information channels, and the like.

Generally, the indication of the upstream RLF provides a signal to downstream devices that the upstream RLF event has occurred, and therefore the receiving downstream devices may begin implementing RLF recovery procedures.

The relay device may then establish a new wireless link (e.g., a third wireless link) with a new upstream backhaul device (e.g., a second upstream backhaul device) based on the upstream RLF. In some aspects, this may include the relay device monitoring for one or more transmissions from a neighboring ANs 305 to identify available backhaul links. When detected, the relay device may establish a wireless link with the neighboring AN 305. For example, the relay device may receive a third indication of an available backhaul connection from one or more signals associated downstream devices and/or an AN 305 that is not currently a part of its backhaul network (e.g., within an AN 305 that was not originally a part of the communication chain of the relay device).

In some aspects, establishing the new wireless link may include the relay device transmitting an RRC message (e.g., an RRC connection complete message, an RRC connection resume message, an RRC connection reestablishment message, and the like). Accordingly, the relay device may establish the new wireless link using RRC messaging techniques. In some aspects, the relay device may establish the new wireless link by identifying a new backhaul wireless link, e.g., based on monitoring for one or more transmissions from a prospective upstream backhaul device.

In some aspects, the relay device may provide multiple access services to one or more downstream devices using or otherwise based on backhaul communications between the relay device and the new upstream backhaul device over the new wireless link. The multiple access services may include backhaul link services and/or access link services, depending upon whether the downstream device is a UE 115 or downstream relay device.

FIGS. 4A-4H illustrate an example of a wireless communications system 400 that supports management of RLF in wireless backhaul in accordance with aspects of the present disclosure. In some examples, wireless communications system 400 may implement aspects of wireless communications systems 100/200/300. In some aspects, wireless communications system 400 may include a plurality of relay devices 405 that form a wireless backhaul network. In some aspects, relay devices 405 may be examples of a base station and/or a UE, which may be examples of corresponding devices described herein. In some aspects, relay devices 405 may be an example of a UEF and/or an ANF (e.g., base station function or gNB function) instantiated on a base station and/or UE.

In some aspects, FIGS. 4A-4D and FIGS. 4E-4H illustrate the different stages of upstream RLF detection and recovery. Generally, wireless communications system 400 may be an example of a backhaul network implemented using one or more wireless links. For example, relay device 405-*a* may be considered an anchor node or device in that it has a high-speed connection to the core network or Internet. For example, relay device 405-*a* may have a fiber link connection, or some other high-speed connection, to the core network.

Each of the other relay devices 405 may then connect to the core network via one or more wireless links (e.g., hops) established between each relay device 405. For example, relay device 405-*b* and relay device 405-*f* may connect directly to the anchor node relay device 405-*a* (e.g., a one hop connection). In this context, relay device 405-*a* may be considered an upstream backhaul device from the perspective of relay devices 405-*b* and 405-*f*. Relay devices 405-*b* and 405-*f* may be considered downstream devices from the perspective of the anchor node relay device 405-*a*. As another example, relay devices 405-*c* an 405-*d* may connect to the anchor node relay device 405-*a* via a wireless link established with relay device 405-*b*. In this example, relay device 405-*a* and 405-*b* would be considered upstream backhaul devices with respect to relay devices 405-*d* and 405-*d*. Similarly, relay devices 405-*c* and 405-*d* would be considered downstream devices from the perspective of relay devices 405-*a* and 405-*b*.

In some aspects, an RLF event may occur for one or more of the wireless links between relay devices 405. Generally, and RLF may occur when the wireless link becomes unavailable or otherwise acceptable for use. For example, the wireless link may become unavailable due to blocking (e.g., due to an object crossing the path of the wireless link), fading, and the like. In some aspects, and RLF may occur when the performance metric of the wireless link fails to satisfy a threshold. For example one or more metrics associated with the wireless link may fall (or rise, depending on the nature of the performance metric) to below an acceptable threshold level to support ongoing to communications over the wireless link. In some aspects, the RLF event may occur based on an out-of-synchronization condition, based on a beam failure condition, and the like.

Figure 4A:
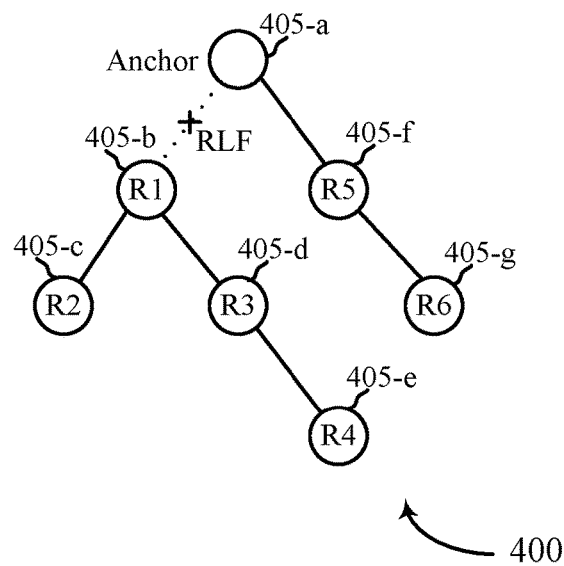
FIGS. 4A-4H illustrate examples of a wireless communications system that supports management of RLF in wireless backhaul in accordance with aspects of the present disclosure.

Turning first to the stage shown in FIG. 4A, an example RLF is illustrated as having occurred over the wireless link between relay device 405-*a* and 405-*b* (indicated by the "X"). The example RLF may be based on any of the discussed techniques above. Relay device 405-*b* may therefore determine or otherwise detect that an upstream RLF has occurred, e.g., based on radio link management monitoring of the wireless link. In this context, relay device 405-*a* would be considered a first upstream backhaul device from the perspective of relay device 405-*b*. Moreover, this may be a one-hop wireless link between relay device 405-*b* and relay device 405-*a*.

Figure 4B:
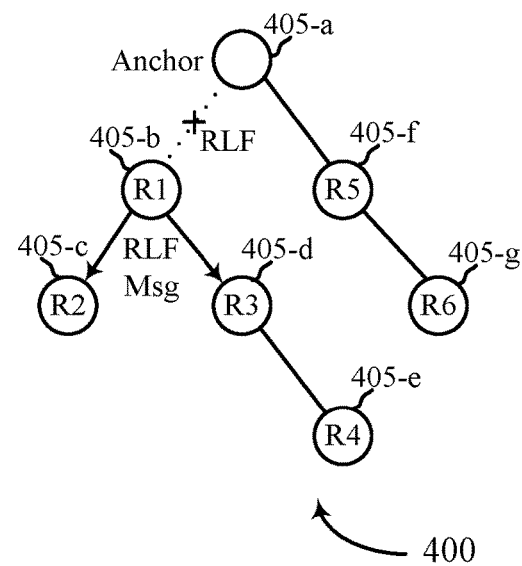

At the stage shown in FIG. 4B, relay device 405-*b* provides a first indication of the upstream RLF over wireless links between the relay device 405-*b* and one or more associated downstream devices (e.g., downstream devices would include relay device 405-*c* and 405-*d*, each with an associated wireless link). In some aspects, relay device 405-*b* may configure the first indication of the upstream RLF to indicate an identifier of the wireless link associated with the upstream RLF and/or an identifier of the upstream backhaul device that initially detected the upstream RLF. In this context, relay device 405-*b* may configure the first indication to identify either the wireless link between relay device 405-*b* and 405-*a* and/or to identify that relay device 405-*b* detected the upstream RLF.

In some aspects, the first indication may be provided by relay device 405-*b* scrambling one or more signals in response to the detected upstream RLF. For example, relay device 405-*b* may conventionally transmit one or more reference signals, synchronization signals, beam management signals, and the like, over the wireless links to each of its downstream devices. Upon detecting the upstream RLF, relay device 405-*b* may scramble, encode, encrypt, and the like, one or more of such signals to convey the indication that the upstream RLF has occurred. In some aspects, the indication of the upstream RLF may be communicated using a MAC message (e.g., a MAC control element (CE)), a layer 2 message, an RRC message, and F1-application layer message, and the like.

In some aspects, relay device 405-*b* may suspend transmission on one or more channels (e.g., reference signals, synchronization signals, system information signals, beam management signals, and the like) in response to detecting the upstream RLF. Relay device 405-*b* may suspend transmission on such channels immediately upon detecting the upstream RLF or may initiate a timer upon detecting the upstream RLF and suspend transmission on such channels when the timer expires. In some aspects, relay devices 405-*c* and/or 405-*d* receiving the indication of the upstream RLF may, from their perspective, be considered detecting an upstream RLF.

Figure 4C:
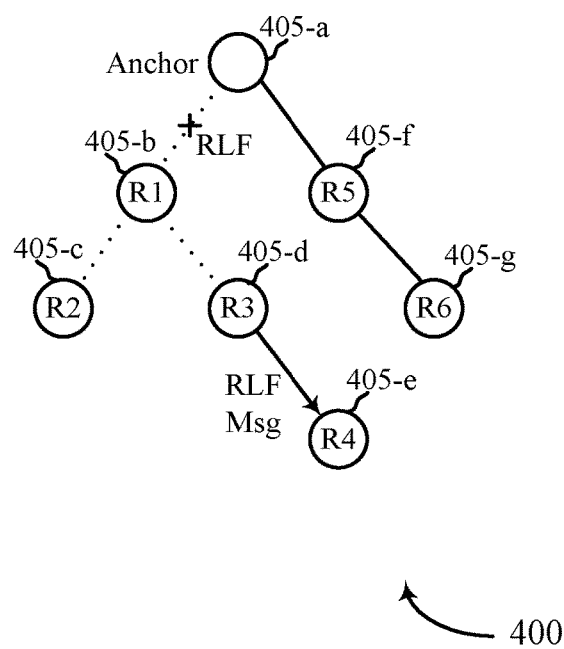

At the stage shown in FIG. 4C, relay device 405-*d* may transmit or otherwise provide a first indication of the upstream RLF over the wireless link between relay device 405-*d* and relay device 405-*e*. As discussed above, the indication of the upstream RLF may be an implicit and/or explicit indication, e.g., may transmit a signal identifying the upstream RLF and/or may suspend transmission on various radio channels. Again, from the perspective of relay device 405-*e*, receiving the indication of the upstream RLF may be considered detecting the upstream RLF.

In some aspects, once each relay device 405 determines or otherwise detects the upstream RLF, each relay device 405 may begin the process of identifying a new path to the anchor node relay device 405-*a*. In some aspects, this may include one or more backup or inactive channels previously identified by the relay device 405. For example, during normal operations each relay device 405 may monitor for and/or otherwise identify potential backup wireless links and/or may actually configure additional backhaul wireless links to be in an inactive status. A first step that each relay device 405 may take when the upstream RLF is detected, and the corresponding indication of the upstream RLF is provided, would be to identify such an active or backup wireless links that would connect them to the anchor node relay device 405-*a*. When no such backup or inactive backhaul wireless links are available, each relay device 405 may begin searching or monitoring for a new wireless link to establish a backhaul connection to anchor node relay device 405-*a*.

Figure 4D:
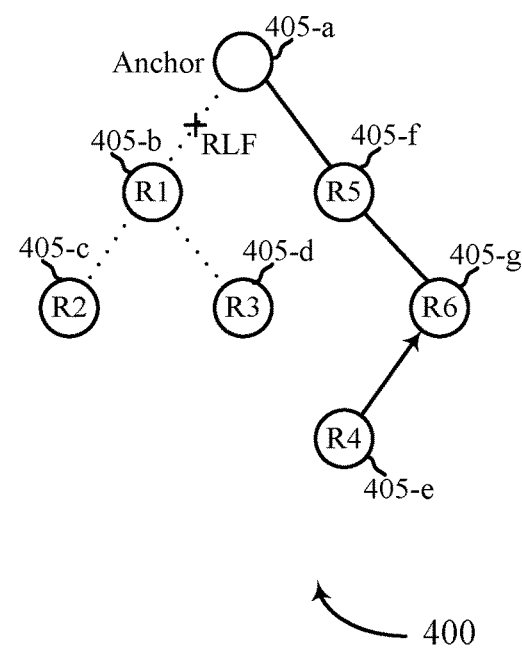

This begins at the stage shown in FIG. 4D in which relay device 405-*e* establishes a new wireless link with the second upstream backhaul device. The wireless link in this context may generally refer to the backhaul connection between relay devices 405-*e* and 405-*g*. At this stage, relay device 405-*e* may begin providing multiple access services to one or more downstream devices based on backhaul communications between relay device 405-*e* and the second upstream backhaul device (e.g., relay device 405-*g*). Of course, relay device 405-*f* accesses the anchor node relay device 405-*a* via a two hop wireless link through relay device 405-*f*.

Figure 4E:
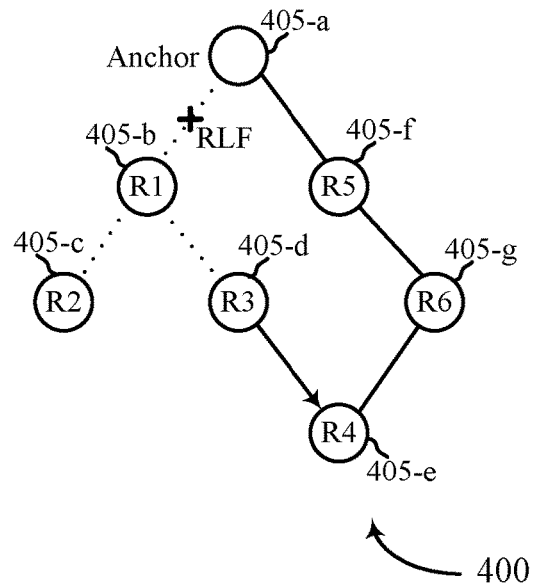
Figure 4F:
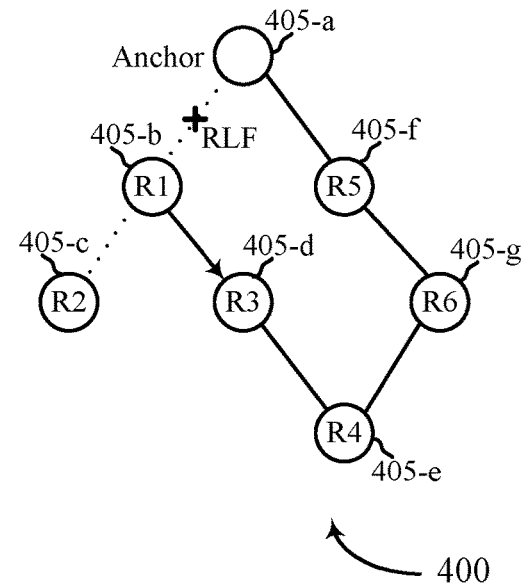
Figure 4G:
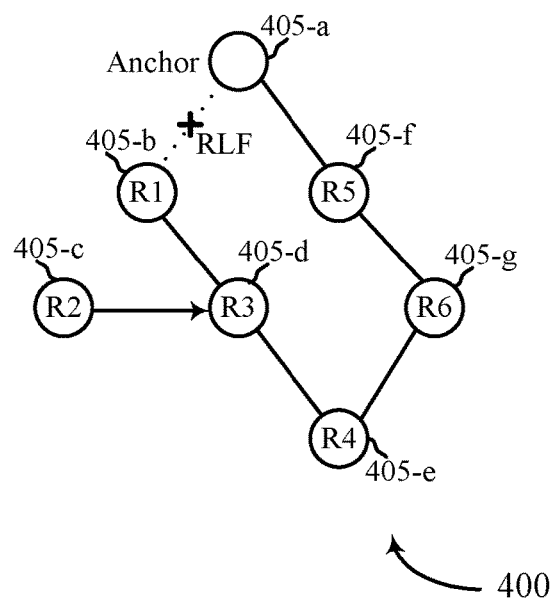

At the stage shown in FIG. 4E, relay device 405-*d* establishes a new wireless link with relay device 405-*e*. At this stage, relay device 405-*d* may begin providing multiple access services to the one or more downstream devices based on backhaul communications between relay device 405-*d* and relay device 405-*e*. At the stage shown in FIG. 4F, relay device 405-*b* establishes a new wireless link with relay device 405-*d*. At this stage relay device 405-*b* may get begin providing multiple access services to one or more downstream devices based on backhaul communications between relay device 405-*b* and 405-*d*. At the stage shown in FIG. 4G, relay device 405-*c* may establish a new wireless link with relay device 405-*d*. At this stage, relay device 405-*c* may begin providing multiple access services to the one or more downstream devices based on backhaul communications between relay device 405-*c* and relay device 405-*d*.

Figure 4H:
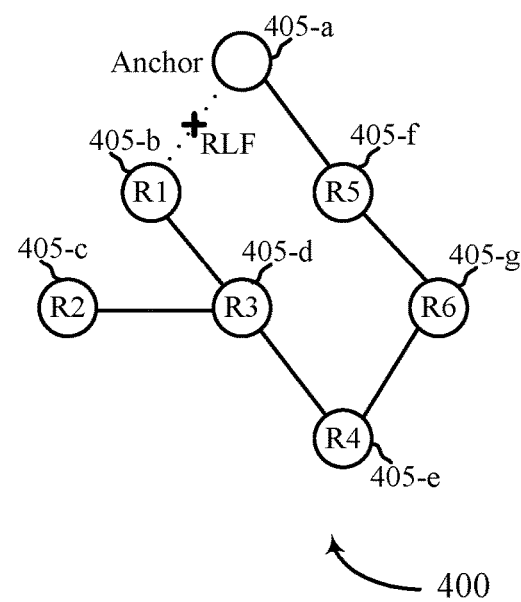

At the stage shown in FIG. 4H, wireless communications system 400 has fully recovered from the RLF event occurring on the wireless link between relay devices 405-*a* and 405-*b*. At this stage, each relay device 405 has a connection to the anchor node relay device 405-*a* via an upstream link over wireless links.

Thus, in some aspects FIGS. 4A-4H show how aspects of the described techniques can work in a tree topology. Generally, relay 1 (R1) informs relays 2 (R2) and 3 (R3) about its backhaul RLF via a BH-RLF-alert message. R3 propagates this alert to relay 4 (R4). At this point, all relay devices 405 affected by the backhaul RLF have been notified, and they can search for alternative attachment points. The notified relay devices 405 may further stop admitting UEs or child-relays, and they may further reject access requests.

The stages shown in FIGS. 4D-4H show a potential recovery procedure after the propagation of BH-RLF-alert messages. At the stage shown in FIG. 4D, R4 has found relay 6 (R6) as an alternative attachment point where it reattaches. Based on this architecture, this reattachment may look differently. R4 may for instance leverage an RRC Connection Reestablishment procedure to establish the attachment point (e.g., wireless link). After R4 has reattached to R6, it is possible for R3 to connect to R4, followed by R1 attaching to R3, and R2 attaching to R3.

In some aspects, in addition to or instead of sending the BH-RLF-alert message (e.g., the first indication of the upstream RLF), it is also possible for the relay device(s) 405 to suspend service to child relays or UEs. Such service suspension could occur gradually, e.g., starting with the suspension of certain channels such as synchronization channels and other broadcast channels. Consequently, child relays and UE will detect an RLF and initiate recovery procedures.

It is also possible to transmit all downlink data buffered for a child relay or UE, but reject all uplink scheduling requests from child relays or UEs. In some aspects, the suspension of services will be effective for devices that do not support the BH-RLF-alert message. This procedure may take more time since each relay device 405 experiencing service suspension will go through an RLF-discovery phase. Consequently, propagation of the BH-RLF-alert message and the subsequent topology recovery as shown in the stage shown in FIG. 4H may consume more time.

Providing the BH-RLF-alert message(s) and service suspension can be both applied in a staggered manner. It is perceivable, for instance, that the relay device 405 observing the upstream RLF (e.g., BH-RLF) or receiving a BH-RLF-alert message from a parent relay transmits a BH-RLF-alert message to child relays and UEs, and subsequently suspends services. In this manner, faster propagation of the indication of the backhaul RLF can be achieved while also informing devices about backhaul RLF that do not support the BH-RLF-alert message.

Alternatively, the BH-RLF-alert message (e.g., the indication of the upstream RLF) could be overlaid on a physical layer signal such as a synchronization signal, e.g., through scrambling. Consequently, devices that cannot decode this overlay will not be able to synchronize, which ultimately leads to RLF. Other devices that do understand the overlay are able to interpret it as a BH-RLF-alert message.

Prior to service suspension or transmission of the BH-RLF-alert message, the relay devices 405 may configure child relays or UEs to increase the frequency of measuring neighbor relay devices 405. This allows child relays and UEs to obtain a more updated candidate list of potential attachment points where they can reconnect. The BH-RLF-alert message or any type of RLF observation may also be interpreted by a child relay or UE as an indication to increase the frequency of measuring neighbor relay devices.

In case one of the R1, R2 or R3 is multi-connected, it is further possible for this relay device 405 to use the alternative link. It may activate and switch to such an alternative link in case this alternative link is in standby mode. In this case, the relay device 405 may not propagate a BH-RLF-alert message and it may not suspend services.

In some aspects, using an alternative link may imply changing routes on the backhaul topology. Switching to an alternative link may imply establishment of new routes via this alternative link and releasing routes via the initial backhaul link. It is further possible that the relay device 405 has a backup path via a child node (e.g., a downstream device) and activating the new path may imply topology changes such that the relay device 405 becomes a descendant of its former child node.

In some aspects, a child node that receives a BH-RLF-alert message from the upstream relay device 405 has a backup path, and upon reception of the BH-RLF-alert message responds with a message indicating availability of such backup path.

In some aspects, additional information may be included in the BH-RLF-alert message such as a relay or link identifier where the RLF has been detected. This allows the relay device 405 receiving a BH-RLF-alert message to make more educated decisions on where to attempt a recovery procedure. For example, the BH-RLF-alert message could for instance include information that the RLF was observed by R1. R4, receiving this BH-RLF-alert message, could consequently dismiss R1 and R2 as immediate attachment points for RLF recovery.

Figure 5:
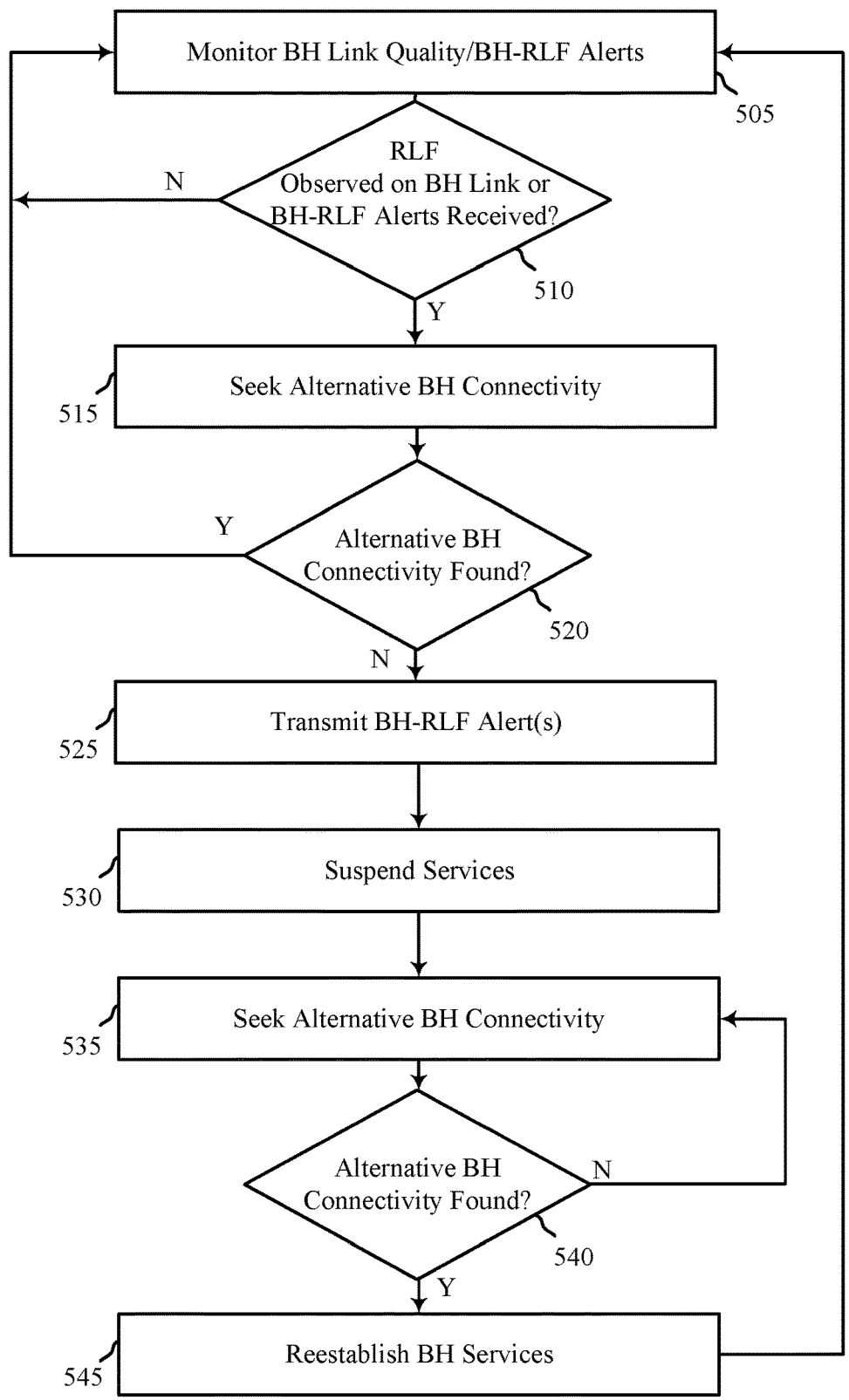
FIG. 5 shows an example of a flowchart illustrating a method that supports management of RLF in wireless backhaul in accordance with aspects of the present disclosure.

FIG. 5 shows an example of a flowchart 500 illustrating a method that supports management of RLF in wireless backhaul in accordance with aspects of the present disclosure. In some examples, flowchart 500 may implement aspects of wireless communications systems 100, 200, 300, or 400. Aspects of flowchart 500 may be implemented by relay device, which may be a node in a wireless backhaul network. In some aspects, the relay device may be example of a base station, a UE, an ANF, or a UEF, which can be examples of corresponding devices described herein. Generally, flowchart 500 illustrates one example for RLF detection and recovery in a wireless backhaul network.

At 505, the relay device may monitor for an upstream RLF. Generally, the relay device may monitor for the upstream RLF by monitoring the backhaul link channel quality (e.g., using radio link management monitoring) and/or by monitoring for receipt of a second indication from a upstream backhaul device that an upstream RLF event has occurred.

At 510, the relay device may determine whether an RLF is observed on an upstream backhaul link or if a BH-RLF-alert message has been received. An RLF event may be considered to occur based on a beam management failure for the upstream wireless link, based on an out-of-synchronization condition for an upstream wireless link, based on the channel performance metric of the upstream wireless link failing to satisfy a threshold, and the like. Moreover, an upstream RLF event may be considered to have occurred or detected if the relay device receives a second indication of the upstream RLF from an upstream wireless device. For example, the upstream wireless device may have detected the upstream RLF from one of its upstream hops and respond by transmitting a the second indication of the upstream RLF (e.g., a BH-RLF-alert message). If the relay device detects the second indication of the upstream RLF from an upstream backhaul device, the relay device may decode the indication to identify which wireless link the upstream RLF has occurred on and/or which upstream backhaul device detected the upstream RLF. Additionally or alternatively, the relay device may attempt to descramble certain signals received from an upstream backhaul device and, if the descrambling is successful, consider that success as the second indication of the upstream RLF.

If no upstream RLF is detected at 510, the relay device may return to 505 and continue to monitor for an upstream RLF. If the relay device detects the upstream RLF at 510, at 515 the relay device may seek an alternative backhaul connectivity (e.g., a third wireless link, the new attachment point, and the like). Generally, the relay device may seek the alternative backhaul connectivity by determining whether there is an inactive backhaul wireless link could be used, by determining whether there is a backup backhaul wireless link that can be selected, and/or based on detecting a new backhaul wireless link using channel monitoring techniques.

At 520, the relay device may determine whether alternative backhaul connectivity is found. If the new backhaul wireless link is detected at 520 (Yes) the relay device may reestablish backhaul connectivity by establishing a new wireless link with the new upstream backhaul device and returning to step 505 to monitor for an upstream RLF. For example, the relay device may utilize one or more RRC messages to establish the new backhaul wireless link with the upstream backhaul device. In some aspects, the relay device may initiate a timer if an upstream RLF is detected and seek alternative backhaul connectivity until a timer expires. In some aspects, the relay device may activate a previously identified backup or inactive backhaul wireless link.

If no new backhaul wireless link is detected at 520 (No), at 525 the relay device may transmit a BH-RLF-alert message to downstream devices. In some aspects, the indication may be explicit or implicit. One example of an explicit indication may include the relay device transmitting a signal that has a bit, a field, and the like, configured to convey the indication that the upstream RLF has occurred. Examples of such a signal may include, but are not limited to, a MAC CE, a layer to sub layer message, an RRC message, a downlink control information (DCI), and the like. In some aspects, the indication may be configured to identify which wireless link the upstream RLF has occurred on and/or which upstream backhaul device initially detected the upstream RLF. Examples of an implicit indication may include the relay device scrambling a signal using a defined or known scrambling sequence for transmission to downstream devices. For example, the relay device may scramble a reference signal, a synchronization signal, a beam management signal, a tracking or position reference signal, and the like, using the known or defined scrambling sequence before transmission. A downstream device receiving the scrambled signal and successfully descrambling the signal may determine that the scrambling conveys the indication of the upstream RLF.

At 530, the relay device may suspend services on one or more radio channels for wireless links between the relay device and one or more of its associated downstream devices. For example, the relay device may suspend transmission of reference signals, synchronization signals, system information signals, broadcast signals, multicast signals, and the like, for a transmission in response to detecting the upstream RLF in some aspects, the relay device may suspend transmission of the signals immediately upon detecting the upstream RLF or after timer expires that was initiated upon detecting the upstream RLF. After suspending services, the relay device returns to 515 and continues to seek alternative backhaul connectivity. The relay device may continue transmission of the suspended services once a new wireless link to a new upstream backhaul device is established.

At 535, the relay device may seek alternative backhaul connectivity in the form of alternative upstream wireless links. For example, the relay device may utilize one or more RRC messages to establish the new backhaul wireless link with the upstream backhaul device. At 540, the relay device may continue searching for alternative backhaul wireless connectivity and determine whether alternative backhaul wireless connectivity is found. If alternative backhaul connectivity is found at 540 (Yes), at 545 the relay device may establish a backhaul wireless link with the identified wireless link and provide multiple-access services to associated downstream devices. If alternative backhaul connectivity is not found at 540 (No), the relay device may return to 535 and continue seeking alternative backhaul connectivity.

Thus, flowchart 500 illustrates an exemplary procedure conducted by a relay device for the propagation of backhaul RLF information by using, e.g., the BH-RLF-alert message, and subsequent recovery. The relay device may monitor the link quality of the backhaul link and monitor for reception of BH-RLF-alert messages from an upstream backhaul device. If an upstream RLF is confirmed on the backhaul link or a BH-RLF-alert message has been received, the relay device seeks backhaul connectivity alternatives. This may include switching to an alternative backhaul link that has already been established. It may further include activation of such an alternative link that is in standby mode.

If such an alternative backhaul link has succeeded, the relay device returns to the monitoring stage at 505. Otherwise, it transmits a BH-RLF-alert message to child relays and potentially UEs (in case they support such a message). Further, admission of child relays or UEs may be advantageously suspended at this stage. This may be accomplished by barring the cell from admission via a broadcast message such as a system information broadcast by explicitly rejecting random-access or admission requests.

Next, radio services are suspended. This will initiate RLF discovery on all downstream devices (e.g., downstream relay devices) that have not received or decoded the BH-RLF-alert message. This downstream relay device then seeks backhaul connectivity alternatives. This may include procedures that consume more time, e.g., discovery of potential neighbor relays and connection reestablishment at the neighbor relays. If alternative connectivity has been found, the relay can reestablish backhaul services and return to the backhaul link monitoring stage at 505.

In some aspects, the BH-RLF-alert message may be sent as a MAC-layer message, e.g., using a MAC CE as defined by cellular RATs such as NR or LTE. It may also be conveyed via an adaptation layer in a L2 radio protocol stack, such as defined by cellular RATs such as NR or LTE. It may further be conveyed in an NR or LTE RRC of F1-application-protocol message. It may be transmitted as a unicast, multicast or broadcast message. The BH-RLF-alert message may apply to cellular RATs such as NR and LTE.

Also, the backhaul link may apply to cellular RATs such as NR or LTE. In this case, RLF detection may be based on the radio-link-monitoring procedure as defined by NR or LTE. RLF may further be based on out-of-synchronization detection or beam-failure detection as defined by LTE or NR. RLF detection may further be based on a measurement event such as defined for NR or LTE.

Aspects of the described techniques may apply to scenarios where each relay device holds a Mobile-Terminal (MT)-function (e.g., a UEF) and a gNB-distributed unit (DU) (e.g., a base station function or ANF), and where the Mobile Terminal-function is used to connect to a parent relay and the gNB-DU-function is used for connection of child-relays or UEs. The described techniques further applies to scenarios where the gNB-DU-function connects to gNB-Centralized-Unit-Function via an F1-interface, where the F1-interface is routed at least in part over wireless backhaul links. The routing may utilize NR L2 protocol layers and these layers may include an adaptation layer, e.g., to carry F1-specific information or routing information.

Aspects of the described techniques may apply to scenarios where a centralized node, e.g., such as a gNB-CU, holds a centralized controller that configures wireless links and routes. In such scenarios, the centralized controller determines link and route changes and it reconfigures links and routes accordingly. The decisions for link and route changes may be based on measurements provided by MT-functions or gNB-DU-functions on relay devices to the centralized controller. In such scenarios, the relay device may follow instructions by the centralized controller until it discovers a change of backhaul state, where interactions with the centralized controller has unacceptably deteriorated. This change of backhaul state has been associated with backhaul RLF. When assuming this change of backhaul state, the relay device activates a certain set of autonomous functions which allows it to regain proper backhaul connectivity to the network. Among others, such functions may include RRC Connection Complete, RRC Connection Resume, RRC Connection Reestablishment or other RRC-based procedures as defined for NR or LTE.

Figure 6:
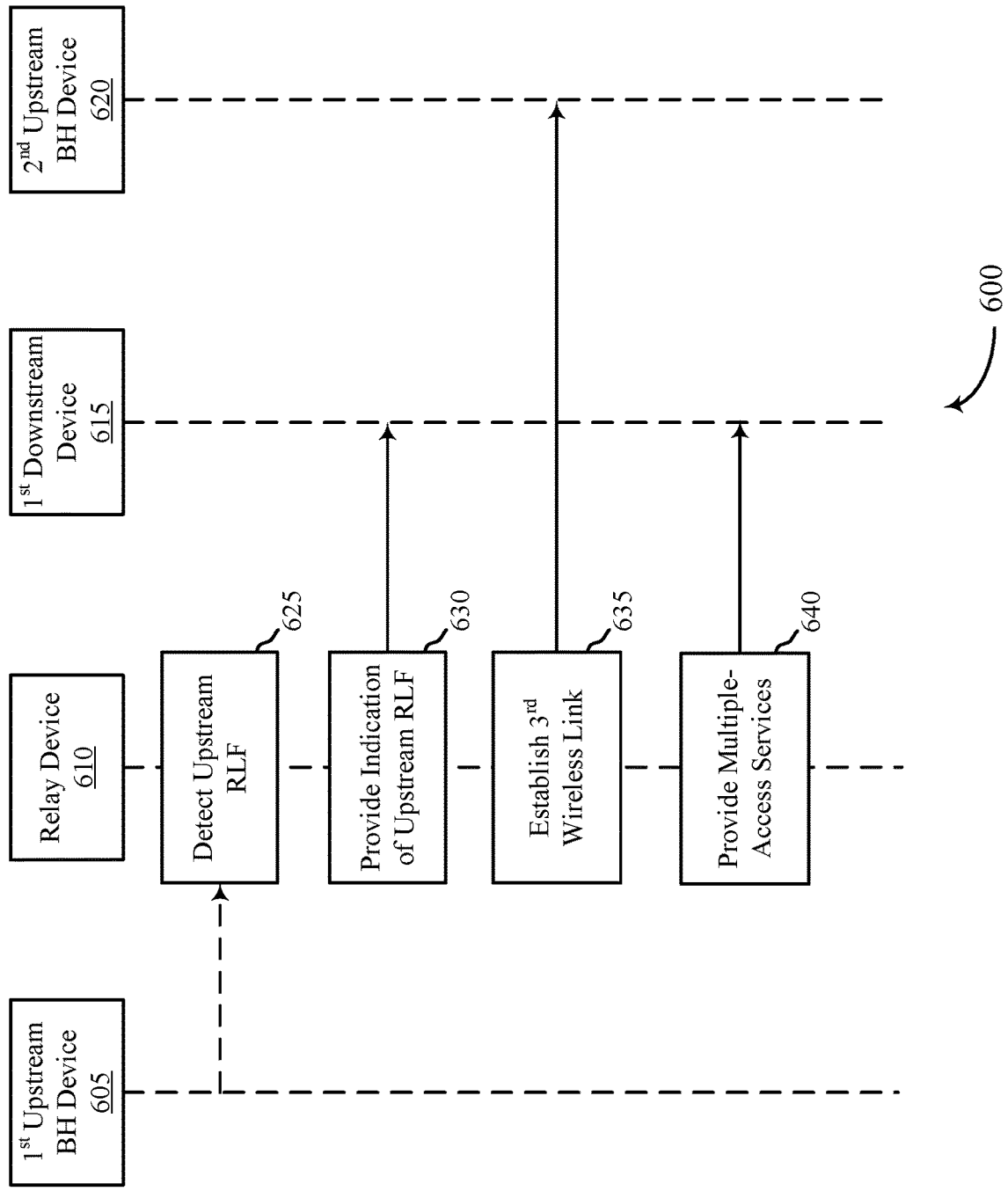
FIG. 6 illustrates an example of a process that supports management of RLF in wireless backhaul in accordance with aspects of the present disclosure.

FIG. 6 illustrates an example of a process 600 that supports management of RLF in wireless backhaul in accordance with aspects of the present disclosure. In some examples, process 600 may implement aspects of wireless communications systems 100, 200, 300, 400, or flowchart 500. Aspects of process 600 may be implemented by first upstream backhaul device 605, relay device 610 in a first downstream device 615, and/or second upstream backhaul device 620, which may be examples of the corresponding devices described herein.

At 625, relay device 610 may detect an upstream RLF associated with an upstream link a wireless backhaul. The wireless backhaul may include the relay device 610, the first upstream backhaul device 605, and/or the first downstream device 615. In some aspects, the wireless backhaul may optionally include the second upstream backhaul device 620, although the second upstream backhaul device 620 may be considered a downstream device from the perspective of relay device 610 in this example.

In some aspects, relay device 610 may detect the upstream RLF based on receiving a second indication of the upstream RLF from the first upstream backhaul device 605 on the first wireless link. The indication may carry or otherwise convey an indication of an identifier of the wireless link experiencing or otherwise associated with the upstream RLF and/or an identifier of the upstream backhaul device that initially detected the upstream RLF. In some aspects, relay device 610 may descramble a signal carrying the indication using a defined or otherwise known scrambling sequence, whereas successfully descrambling the signal is considered detecting the upstream RLF.

In some aspects, relay device 610 may detect the upstream RLF by monitoring the wireless link between the relay device 610 and the first upstream backhaul device 605. For example, the relay device 610 may perform radio link monitoring of the first wireless link between the relay device 610 in the first upstream backhaul device 605. The relay device 610 may determine, based on the radio link monitoring, that a performance metric of the first wireless link fails to satisfy a threshold performance metric. Accordingly, this may be considered detecting the upstream RLF from the perspective of the relay device 610. In some aspects, relay device 610 may transmit a configuration signal to each associated downstream device (e.g., to the first downstream device 615 that configures an increase in the frequency with which the first downstream device 615 performs channel measurements on one or more associated wireless links.

In some aspects, detecting the upstream are RLF may be based on determining that an out-of-synchronization condition has occurred for the first wireless link between the relay device 610 and the first upstream backhaul device 605. In some aspects, detecting the upstream RLF may be based on determining that a beam failure event has occurred for a beam being used for the wireless link between the relay device 610 and the first upstream backhaul device 605.

In some aspects, relay device 610 may empty a downlink buffer storing data for the first downstream device 615 by transmitting the data over the second wireless link. In some aspects, relay device 610 may empty the downlink buffer in response to detecting the upstream RLF. In some aspects, relay device 610 may receive an uplink scheduling request from the first downstream device 615 and reject the uplink scheduling request based on the detection of the upstream RLF.

At 630, relay device 610 may provide a first indication of the upstream RLF over a second wireless link between the relay device 610 and the first downstream device 615. In some aspects, relay device 610 may provide the indication to each downstream device (e.g., each downstream relay device and/or each UE). In some aspects, relay device 610 may configure the first indication of the upstream RLF to carry or otherwise convey an indication of an identifier of the wireless link associated with the upstream RLF and/or an identifier of an upstream backhaul device that initially detected the upstream RLF.

In some aspects, the first and/or second indications of the upstream RLF may include an RLF backhaul alert message (e.g., a BH-RLF-alert message). In some aspects, the indication of the upstream RLF may be provided by performing a unicast transmission, multicast transmission, and/or a broadcast transmission. In some aspects, the indication of the upstream RLF may be provided in a MAC layer message, a layer 2 sub layer message, an RRC message, a F1-application layer message, and the like. In some aspects, the base station function (e.g., ANF) of relay device 610 and/or UEF of relay device 610 may manage one or more aspects of communications on the first wireless link, the second wireless link, and/or the third wireless link, respectively.

In some aspects, relay device 610 may configure the first indication of the upstream RLF to carry or otherwise convey an indication of an identifier of the wireless link associated with the upstream RLF and/or an identifier of the upstream backhaul device that initially detected the upstream RLF.

In some aspects, the relay device 610 may provide the first indication of the upstream RLF by scrambling a signal using a defined scrambling sequence. For example, the relay device 610 may scramble a synchronization signal, a reference signal, a tracking reference signal, a position reference signal, a beam reference signal, and the like, using the defined scrambling sequence. The first downstream device 615 successfully descrambling the signal may constitute receiving the indication of the upstream RLF and detecting the upstream RLF.

At 635, relay device 610 may establish a third wireless link with the second upstream backhaul device 620 in response to the detected upstream RLF. For example, relay device 610 may receive an indication (e.g., a third indication) of an available backhaul connection from the first downstream device 615 (or some other downstream device or directly from the second upstream backhaul device 620). The relay device 610 may establish the third wireless link with the second upstream backhaul device 620 based on the indication of the available backhaul connection.

In some aspects, relay device 610 may transmit an RRC message to the second upstream backhaul device 620 to establish the third wireless link. For example, the relay device 640 may transmit an RRC connection complete message, an RRC connection resume message, and/or an RRC connection establishment message to the second upstream backhaul device 620 to establish the third wireless link.

At 640, relay device 610 may provide multiple access services to one or more downstream devices based on backhaul communications between the relay device 610 and the second upstream backhaul device 620 over the third wireless link. The multiple access services may include backhaul services and/or access services, e.g., depending upon how the downstream device(s) is(are) configured.

Thus, process 600 illustrates a method by a relay device 610 for providing multiple-access wireless services via a radio interface having a first wireless backhaul link. The example method includes relay device 610: confirming that an upstream RLF has occurred on said wireless backhaul link; based on said confirmation, transmitting a backhaul-RLF-alert message on said radio interface; establishing a second wireless backhaul link; and using the second wireless backhaul link to provide multiple-access wireless services via said radio interface.

In some aspects, the confirmation of the upstream RLF may be based on, a radio-link monitoring of the first backhaul link and/or the reception of a backhaul-RLF-alert message. In some aspects, the confirmation of the upstream RLF may be based on a deterioration of the radio-link quality below an acceptable level and it may include the detection of out-of-synchronization or beam-failure.

In some aspects, transmission of the BH-RLF-alert message may occur to a selected set of child relay devices (e.g., first downstream device 615). The BH-RLF-alert message may include information related to a link or a node where RLF has occurred. Establishing a second backhaul link may include at least one of switching to an existing backhaul link, activation of a backup backhaul link, or establishment of a new backhaul link.

Upon confirmation of the upstream RLF, relay device 610 may suspend a set of radio channels at said radio interface, where such suspending includes at least a synchronization channel or the transmission of downlink reference signals, and upon establishing a second backhaul link, reestablishing said suspended radio channels. In some aspects, the second backhaul link may be established with a former child node connected via the wireless radio interface. Relay device 610 may receive a message from a child node indicating the availability of backhaul connectivity. When sending a BH-RLF-alert message, relay device 610 may set a timer and suspend a set of radio channels after expiration of the timer.

In some aspects, relay device 610 may have at least a subset of a first cellular base station functions (such as a gNB-DU, ANF, and the like) to support said radio interface and using a mobile-terminal function (such as a UEF) to connect to a cellular base station function for the first or the second backhaul link. In some aspects, relay device 610 may use a cellular access technology such as NR or LTE for the radio interface, e.g., the first and/or the second backhaul links. The BH-RLF-alert message may be sent via a MAC-layer control message, a layer-2 sublayer message, a radio resource control message or an F1-application-layer message.

In some aspects, the establishment of said second wireless backhaul may include a cellular RRC message, such as an RRC-Connection-Complete, RRC-Connection-Resume or RRC-Connection-Reestablishment message. The establishment of said second wireless backhaul may include the establishment of a new route to a wireline network. The BH-RLF-alert message may be sent via unicast, multicast or broadcast message transmission.

Figure 7:
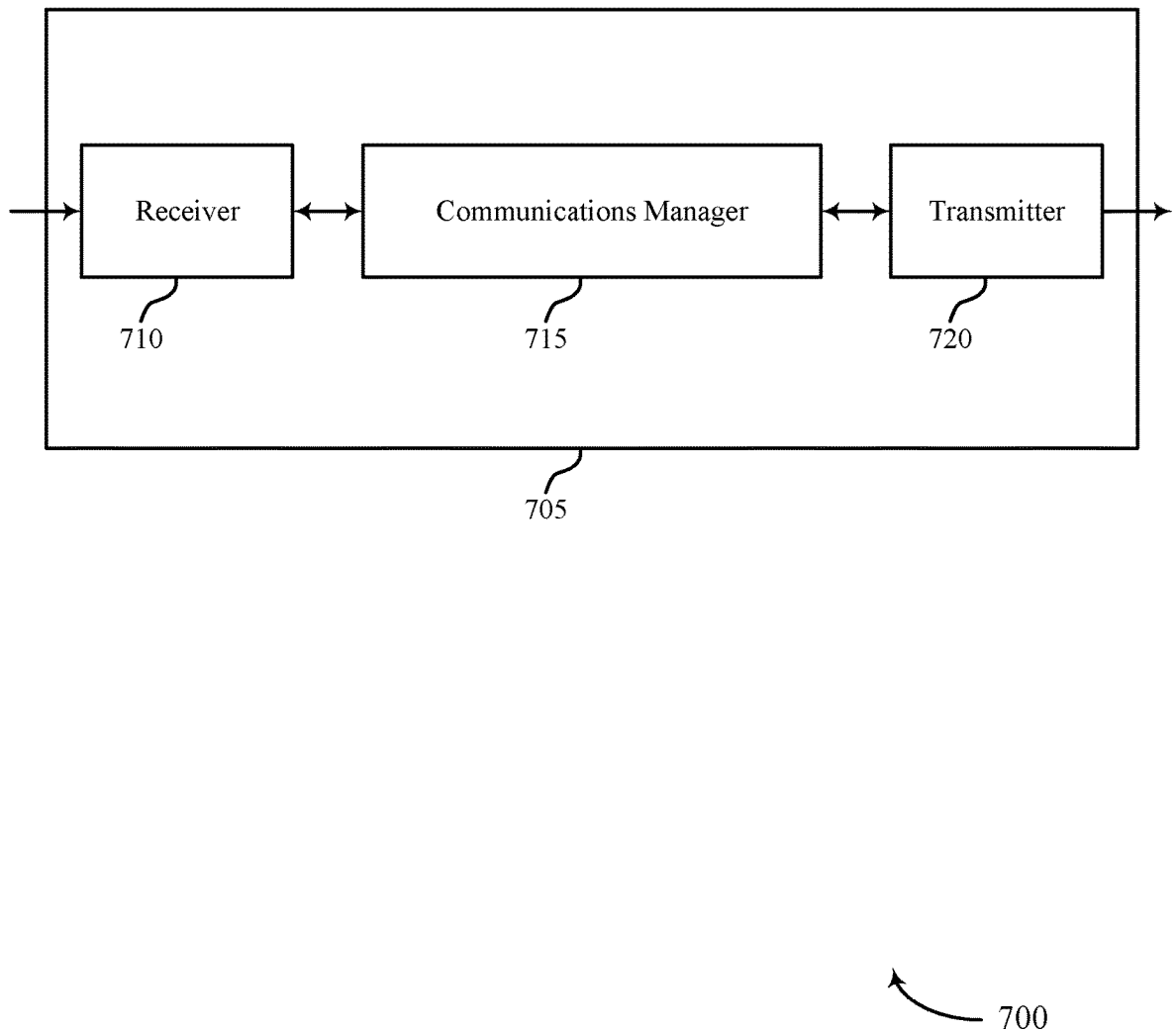
FIGS. 7 and 8 show block diagrams of devices that support management of RLF in wireless backhaul in accordance with aspects of the present disclosure.

FIG. 7 shows a block diagram 700 of a device 705 that supports management of RLF in wireless backhaul in accordance with aspects of the present disclosure. The device 705 may be an example of aspects of a UE 115 or base station 105 as described herein. The device 705 may include a receiver 710, a communications manager 715, and a transmitter 720. The device 705 may also include a processor. Each of these components may be in communication with one another (e.g., via one or more buses).

Receiver 710 may receive information such as packets, user data, or control information associated with various information channels (e.g., control channels, data channels, and information related to management of RLF in wireless backhaul, etc.). Information may be passed on to other components of the device 705. The receiver 710 may be an example of aspects of the transceiver 1020 or 1120 as described with reference to FIGS. 10 and 11. The receiver 710 may utilize a single antenna or a set of antennas.

The communications manager 715 may detect an upstream RLF associated with an upstream link of a wireless backhaul, where the wireless backhaul includes a first wireless link between the relay device and a first upstream backhaul device, provide a first indication of the upstream RLF over a second wireless link between the relay device and a first downstream device, establish a third wireless link with a second upstream backhaul device based on the detected upstream RLF, and provide multiple-access services to one or more downstream devices, where providing the multiple-access services is based on backhaul communications between the relay device and the second upstream backhaul device over the third wireless link. The communications manager 715 may be an example of aspects of the communications manager 1010 or 1110 as described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 715 as described herein may be implemented to realize one or more potential advantages discussed herein. One implementation may allow the device 705 to detect an upstream RLF associated with an upstream link of a wireless backhaul and establish a wireless link with a second upstream backhaul device based on the detected upstream RLF. Accordingly, the device 705 may provide multiple-access services to one or more downstream devices using these established links. Thus, the techniques disclosed in this paper facilitate the device 705 to efficiently detect an RLF, and to efficiently recover from the detected RLF. As such, the techniques described herein may provide relative latency improvements by way of the faster detection and recovery, which may further conserve over-the-air resources.

Transmitter 720 may transmit signals generated by other components of the device 705. In some examples, the transmitter 720 may be collocated with a receiver 710 in a transceiver module. For example, the transmitter 720 may be an example of aspects of the transceiver 1020 or 1120 as described with reference to FIGS. 10 and 11. The transmitter 720 may utilize a single antenna or a set of antennas.

Figure 8:
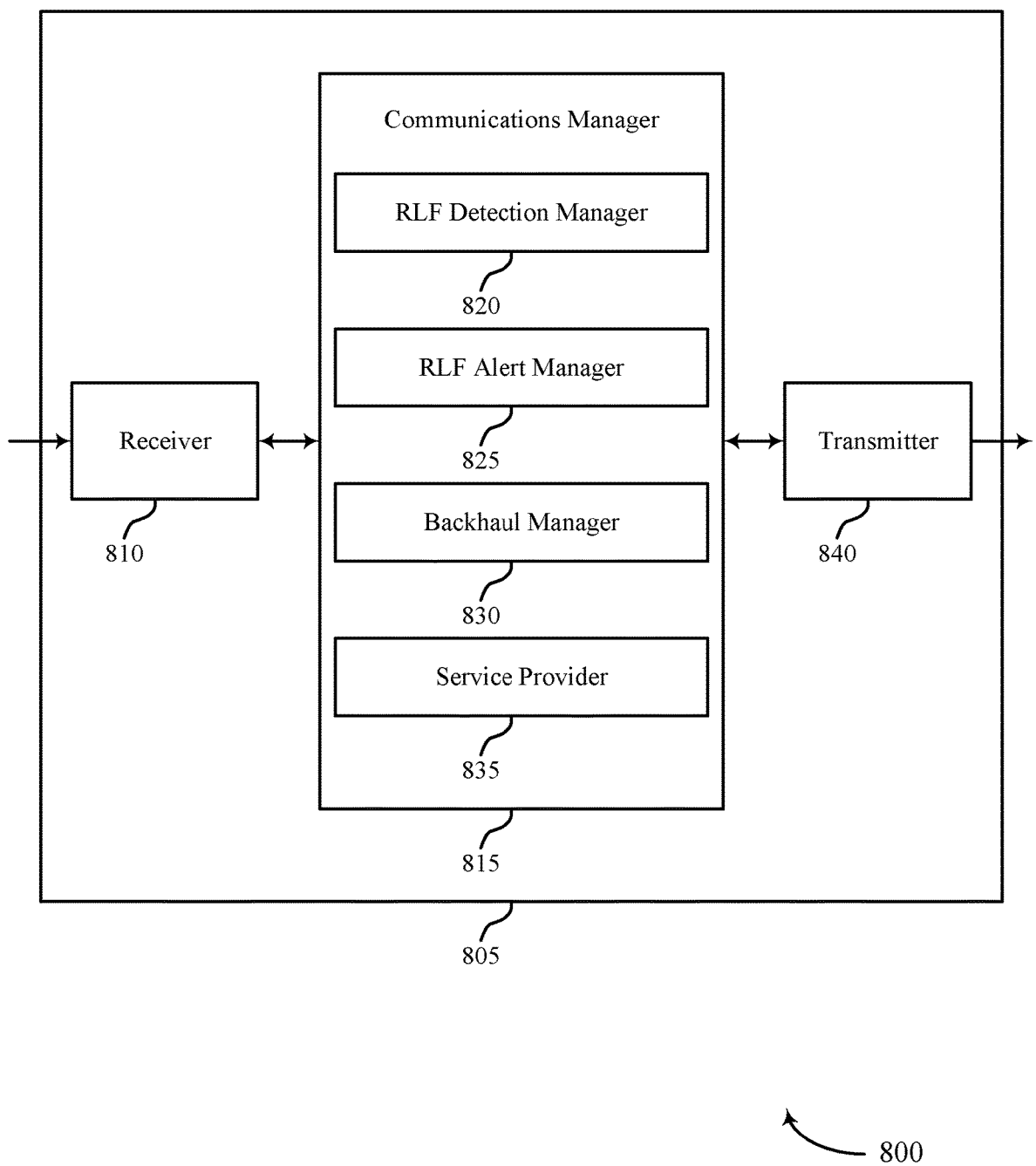

FIG. 8 shows a block diagram 800 of a device 805 that supports management of RLF in wireless backhaul in accordance with aspects of the present disclosure. The device 805 may be an example of aspects of a device 705, a UE 115, or a base station 105 as described herein. The device 805 may include a receiver 810, a communications manager 815, and a transmitter 840. The device 805 may also include a processor. Each of these components may be in communication with one another (e.g., via one or more buses).

Receiver 810 may receive information such as packets, user data, or control information associated with various information channels (e.g., control channels, data channels, and information related to management of RLF in wireless backhaul, etc.). Information may be passed on to other components of the device 805. The receiver 810 may be an example of aspects of the transceiver 1020 or 1120 as described with reference to FIGS. 10 and 11. The receiver 810 may utilize a single antenna or a set of antennas.

The communications manager 815 may be an example of aspects of the communications manager 715 as described herein. The communications manager 815 may include an RLF detection manager 820, an RLF alert manager 825, a backhaul manager 830, and a service provider 835. The communications manager 815 may be an example of aspects of the communications manager 1010 or 1110 as described herein.

The RLF detection manager 820 may detect an upstream RLF associated with an upstream link of a wireless backhaul, where the wireless backhaul includes a first wireless link between the relay device and a first upstream backhaul device.

The RLF alert manager 825 may provide a first indication of the upstream RLF over a second wireless link between the relay device and a first downstream device.

The backhaul manager 830 may establish a third wireless link with a second upstream backhaul device based on the detected upstream RLF.

The service provider 835 may provide multiple-access services to one or more downstream devices, where providing the multiple-access services is based on backhaul communications between the relay device and the second upstream backhaul device over the third wireless link.

In some implementations, the actions performed by the RLF detection manager 820, the backhaul manager 830, and the service provider 835, each included in the communications manager 815, as described herein, may facilitate the processor 1040, as described with reference to FIG. 10, to more efficiently cause the device 805 to perform various functions. For example, the device 805 may detect an upstream RLF associated with an upstream link of a wireless backhaul and establish a wireless link with a second upstream backhaul device based on the detected upstream RLF. Accordingly, the device 805 may provide multiple-access services to one or more downstream devices using these established links. Thus, the techniques disclosed in this paper facilitate the device 805 to efficiently detect an RLF, and to efficiently recover from the detected RLF. As such, the techniques described herein may provide relative latency improvements by way of the faster detection and recovery. These latency improvements may correspondingly conserve spectral resources through a reduced number of transmissions, and reduce processing complexity for the processor of the device 805. This may in turn provide power savings and processing resources for the processor of the device 805.

Transmitter 840 may transmit signals generated by other components of the device 805. In some examples, the transmitter 840 may be collocated with a receiver 810 in a transceiver module. For example, the transmitter 840 may be an example of aspects of the transceiver 1020 or 1120 as described with reference to FIGS. 10 and 11. The transmitter 840 may utilize a single antenna or a set of antennas.

Figure 9:
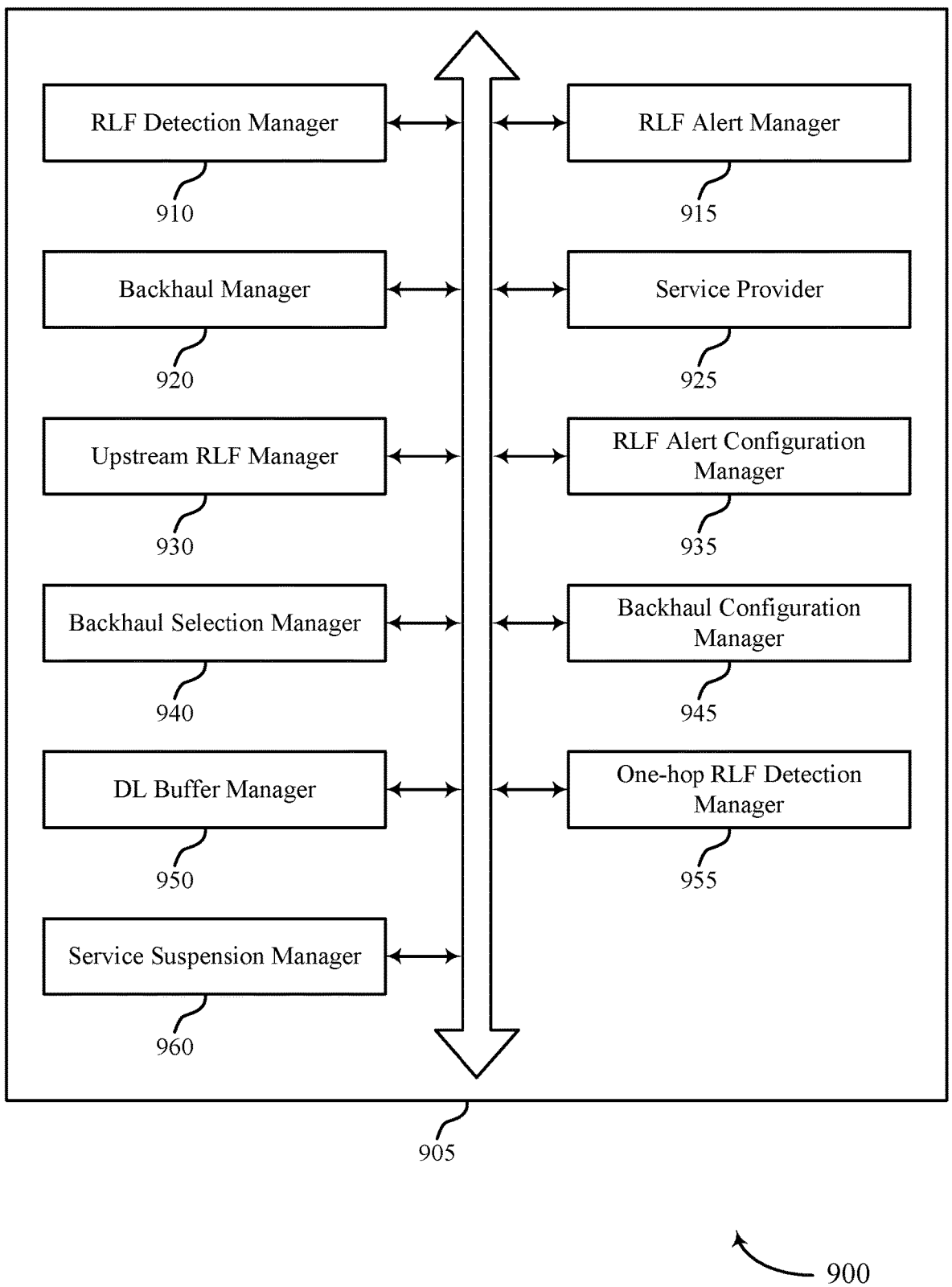
FIG. 9 shows a block diagram of a communications manager that supports management of RLF in wireless backhaul in accordance with aspects of the present disclosure.

FIG. 9 shows a block diagram 900 of a communications manager 905 that supports management of RLF in wireless backhaul in accordance with aspects of the present disclosure. The communications manager 905 may be an example of aspects of a communications manager 715, a communications manager 815, or a communications manager 1010 described herein. The communications manager 905 may include an RLF detection manager 910, an RLF alert manager 915, a backhaul manager 920, a service provider 925, an upstream RLF manager 930, an RLF alert configuration manager 935, a backhaul selection manager 940, a backhaul configuration manager 945, a downlink buffer manager 950, an one-hop RLF detection manager 955, and a service suspension manager 960. Each of these modules may communicate, directly or indirectly, with one another (e.g., via one or more buses).

The RLF detection manager 910 may detect an upstream RLF associated with an upstream link of a wireless backhaul, where the wireless backhaul includes a first wireless link between the relay device and a first upstream backhaul device.

The RLF alert manager 915 may provide a first indication of the upstream RLF over a second wireless link between the relay device and a first downstream device. In some examples, the RLF alert manager 915 may perform one or more of: a unicast transmission, or a multi-cast transmission, or a broadcast transmission. In some cases, the downstream device may be a downstream relay device, or a user equipment. In some cases, the first downstream device includes the second upstream backhaul device. In some cases, the first downstream device is different from the second upstream backhaul device. In some cases, a MAC layer message, or a layer-2 sublayer message, or an RRC message, or an F1-application layer message may be used to provide the first indication of the upstream RLF. In some cases, the first indication of the upstream RLF includes an RLF backhaul alert message, which may also be referred to as a BH-RLF-alert message.

The backhaul manager 920 may establish a third wireless link with a second upstream backhaul device based on the detected upstream RLF. In some cases, the third wireless link includes at least one of a configured wireless link, an inactive wireless link, or a new wireless link. In some cases, the first upstream backhaul device includes the second upstream backhaul device. In some cases, the first upstream backhaul device is different from the second upstream backhaul device. In some cases, a base station function (e.g., ANF) of the relay device manages communications the first wireless link and the third wireless link, and a user equipment-function (e.g., UEF) of the relay device manages communications of the second wireless link. In some cases, one or more of the first wireless link, or the second wireless link, or the third wireless link include a cellular wireless link. In some cases, the third wireless link is associated with a first anchor device and the first wireless link is associated with a second anchor device, the first anchor device being different from the second anchor device. In some cases, the third wireless link and the first wireless link are associated with a first anchor device.

The service provider 925 may provide multiple-access services to one or more downstream devices, where providing the multiple-access services is based on backhaul communications between the relay device and the second upstream backhaul device over the third wireless link.

The upstream RLF manager 930 may receive, from the first upstream backhaul device on the first wireless link, a second indication of the upstream RLF, where the second indication of the upstream RLF is received before providing the first indication of the upstream RLF. In some examples, descrambling a signal carrying the second indication using a defined scrambling sequence, where successfully descrambling the signal includes detecting the upstream RLF. In some cases, an identifier of a wireless link associated with the upstream RLF, or an identifier of an upstream backhaul device that initially detected the upstream RLF, may be included in the second indication of the upstream RLF.

The RLF alert configuration manager 935 may configure the first indication of the upstream RLF to include an identifier of a wireless link associated with the upstream RLF, or an identifier of an upstream backhaul device that initially detected the upstream RLF, or a combination thereof. In some examples, the RLF alert configuration manager 935 may scramble a signal using a defined scrambling sequence based on the detecting the upstream RLF. In some cases, a synchronization signal, a reference signal, a tracking reference signal, a position reference signal, or a beam management reference signal may be the signal that is scrambled.

The backhaul selection manager 940 may receive a third indication of an available backhaul connection from one or more of: the first downstream device or a second downstream device, where the third wireless link is based on the available backhaul connection.

The backhaul configuration manager 945 may transmit an RRC message to the second upstream backhaul device to establish the third wireless link with the second upstream backhaul device. In some cases, an RRC connection complete message, or an RRC connection resume message, or an RRC connection reestablishment message may be used to establish the third wireless link with the second upstream backhaul device.

The downlink buffer manager 950 may empty a downlink buffer storing data for the first downstream device by transmitting the data over the second wireless link after detecting the upstream RLF. In some examples, the downlink buffer manager 950 may receive an uplink scheduling request from the first downstream device and may reject the uplink scheduling request based on the detected upstream RLF.

The one-hop RLF detection manager 955 may perform radio link monitoring of the first wireless link between the relay device and the first upstream backhaul device to detect the upstream RLF. In some examples, the one-hop RLF detection manager 955 may determine, based on the radio link monitoring, that a performance metric of the first wireless link fails to satisfy a threshold performance metric.

In some examples, the one-hop RLF detection manager 955 may transmit a configuration signal to one or more of: the first downstream device or a second downstream device, where the configuration signal is configured to increase a frequency with which the first downstream device or the second downstream device performs channel measurements.

In some examples, the one-hop RLF detection manager 955 may determine that an out-of-synchronization condition has occurred for the first wireless link between the relay device and the first upstream backhaul device to detect the upstream RLF. In some examples, the one-hop RLF detection manager 955 may determine that a beam failure event has occurred for a beam being used for the first wireless link between the relay device and the first upstream backhaul device to detect the upstream RLF.

The service suspension manager 960 may suspend transmission of one or more radio channels of the second wireless link. In some examples, the service suspension manager 960 may reestablish transmission of the one or more radio channels over the second wireless link upon establishment of the third wireless link between the relay device and the second upstream backhaul device.

In some examples, the service suspension manager 960 may start a timer upon detecting the upstream RLF and may suspend transmission of the one or more radio channels upon expiry of the timer. In some cases, a synchronization channel, a reference signal channel may be suspended.

Figure 10:
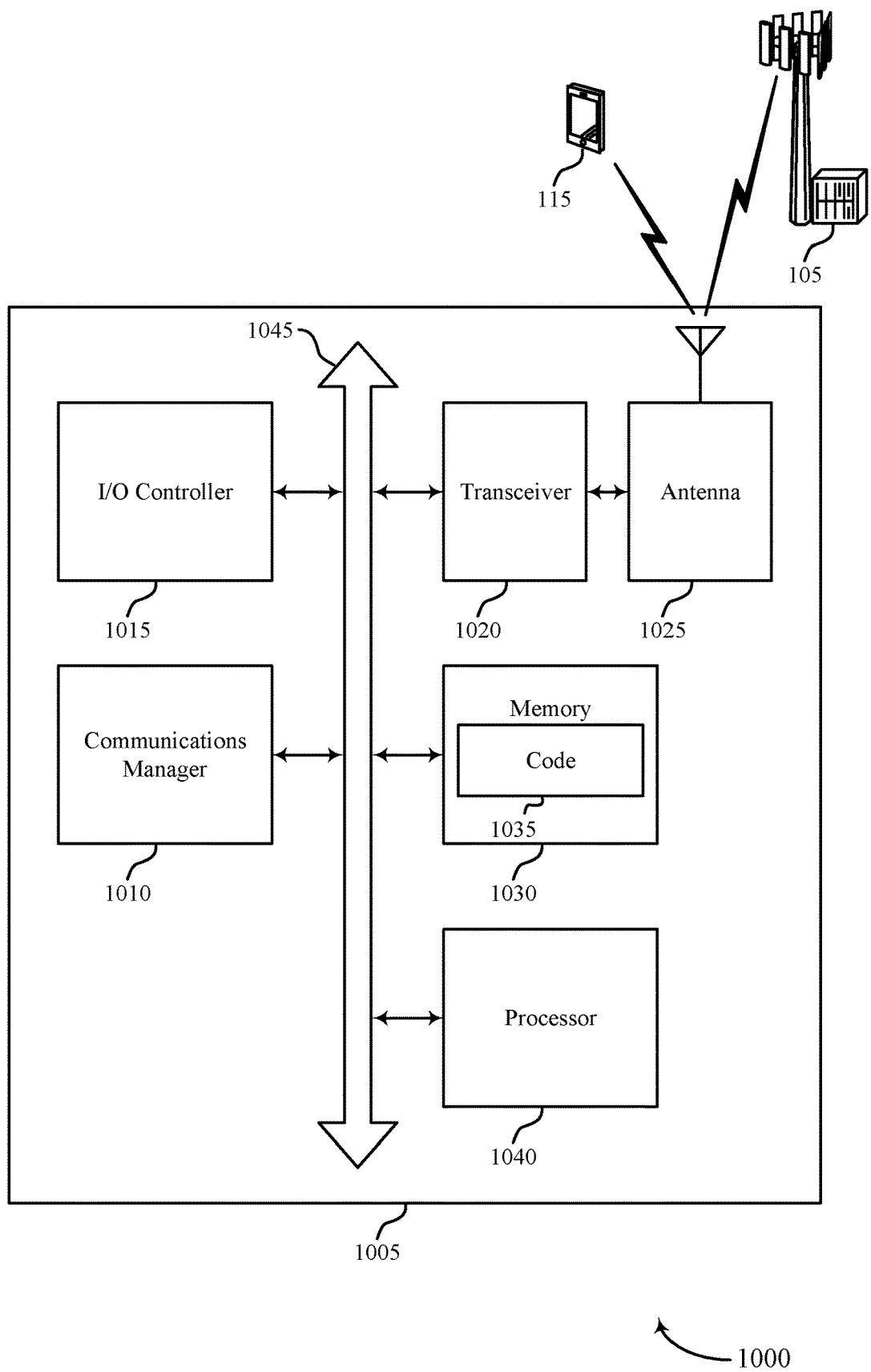
FIG. 10 shows a diagram of a system including a device that supports management of RLF in wireless backhaul in accordance with aspects of the present disclosure.

FIG. 10 shows a diagram of a system 1000 including a device 1005 that supports management of RLF in wireless backhaul in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, a transceiver 1020, an antenna 1025, memory 1030, a processor 1040, and an I/O controller 1050. These components may be in electronic communication via one or more buses (e.g., bus 1055).

The communications manager 1010 may detect an upstream RLF associated with an upstream link of a wireless backhaul, where the wireless backhaul includes a first wireless link between the relay device and a first upstream backhaul device, provide a first indication of the upstream RLF over a second wireless link between the relay device and a first downstream device, establish a third wireless link with a second upstream backhaul device based on the detected upstream RLF, and provide multiple-access services to one or more downstream devices, where providing the multiple-access services is based on backhaul communications between the relay device and the second upstream backhaul device over the third wireless link.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM), read-only memory (ROM), or a combination thereof. The memory 1030 may store computer-readable code 1035 including instructions that, when executed by a processor (e.g., the processor 1040) cause the device to perform various functions described herein. In some cases, the memory 1030 may contain, among other things, a Basic Input/Output System (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting management of RLF in wireless backhaul).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WINDOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
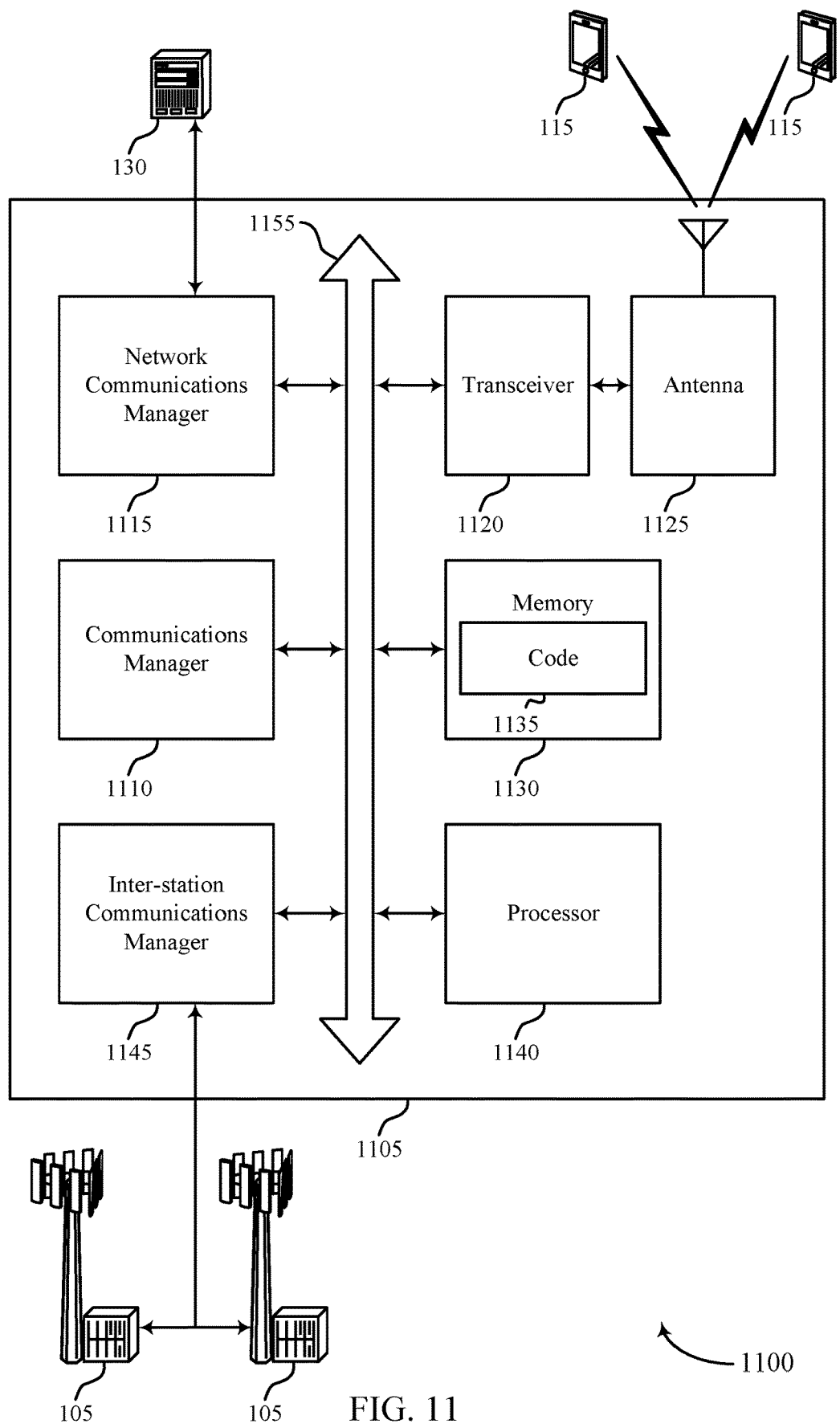
FIG. 11 shows a diagram of a system including a base station that supports management of RLF in wireless backhaul in accordance with aspects of the present disclosure.

FIG. 11 shows a diagram of a system 1100 including a device 1105 that supports management of RLF in wireless backhaul in accordance with aspects of the present disclosure. The device 1105 may be an example of or include the components of device 705, device 805, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1155).

The communications manager 1110 may detect an upstream RLF associated with an upstream link of a wireless backhaul, where the wireless backhaul includes a first wireless link between the relay device and a first upstream backhaul device, provide a first indication of the upstream RLF over a second wireless link between the relay device and a first downstream device, establish a third wireless link with a second upstream backhaul device based on the detected upstream RLF, and provide multiple-access services to one or more downstream devices, where providing the multiple-access services is based on backhaul communications between the relay device and the second upstream backhaul device over the third wireless link.

Network communications manager 1115 may manage communications with the core network (e.g., via one or more wired backhaul links). For example, the network communications manager 1115 may manage the transfer of data communications for client devices, such as one or more UEs 115.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting management of RLF in wireless backhaul).

Inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, inter-station communications manager 1145 may provide an X2 interface within an LTE/LTE-A wireless communications network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
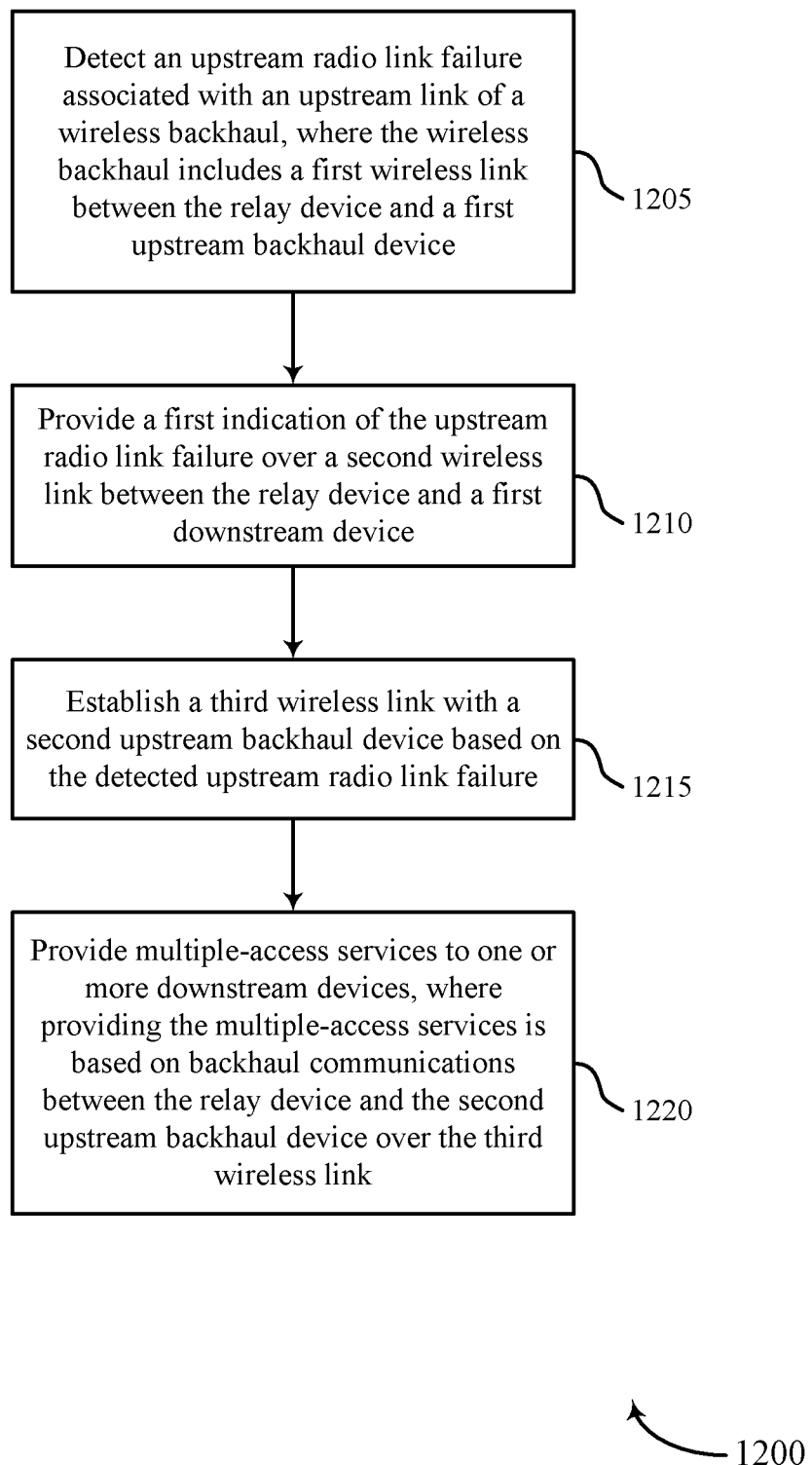
FIGS. 12 through 14 show flowcharts illustrating methods that support management of RLF in wireless backhaul in accordance with aspects of the present disclosure.

FIG. 12 shows a flowchart illustrating a method 1200 that supports management of RLF in wireless backhaul in accordance with aspects of the present disclosure. The operations of method 1200 may be implemented by a relay device, a UE 115, or base station 105 or its components as described herein. For example, the operations of method 1200 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may detect an upstream RLF associated with an upstream link of a wireless backhaul, where the wireless backhaul includes a first wireless link between the relay device and a first upstream backhaul device. The operations of 1205 may be performed according to the methods described herein. In some examples, aspects of the operations of 1205 may be performed by an RLF detection manager as described with reference to FIGS. 7 through 11.

At 1210, the UE or base station may provide a first indication of the upstream RLF over a second wireless link between the relay device and a first downstream device. The operations of 1210 may be performed according to the methods described herein. In some examples, aspects of the operations of 1210 may be performed by an RLF alert manager as described with reference to FIGS. 7 through 11.

At 1215, the UE or base station may establish a third wireless link with a second upstream backhaul device based on the detected upstream RLF. The operations of 1215 may be performed according to the methods described herein. In some examples, aspects of the operations of 1215 may be performed by a backhaul manager as described with reference to FIGS. 7 through 11.

At 1220, the UE or base station may provide multiple-access services to one or more downstream devices, where providing the multiple-access services is based on backhaul communications between the relay device and the second upstream backhaul device over the third wireless link. The operations of 1220 may be performed according to the methods described herein. In some examples, aspects of the operations of 1220 may be performed by a service provider as described with reference to FIGS. 7 through 11.

Figure 13:
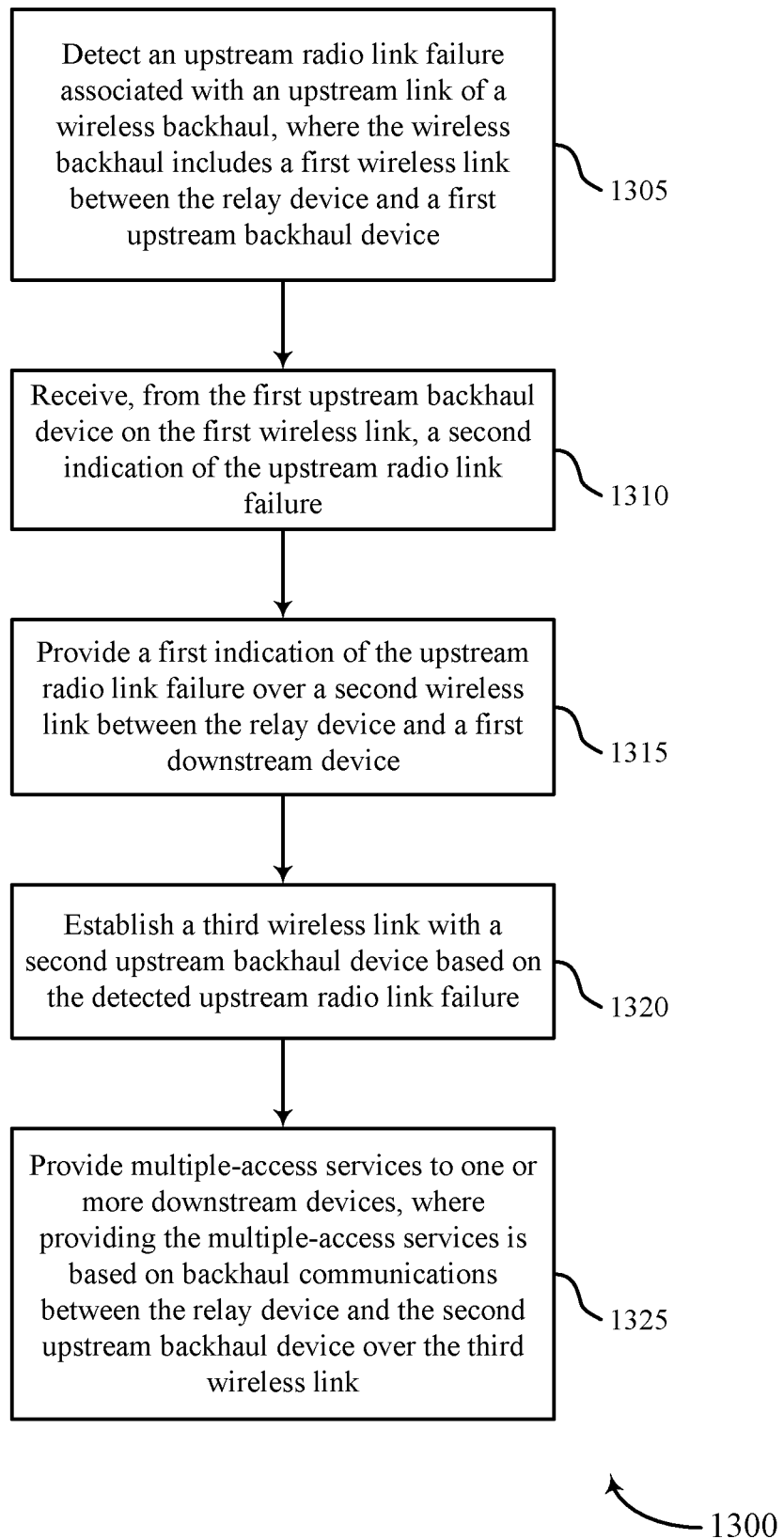

FIG. 13 shows a flowchart illustrating a method 1300 that supports management of RLF in wireless backhaul in accordance with aspects of the present disclosure. The operations of method 1300 may be implemented by a relay device, a UE 115, or base station 105 or its components as described herein. For example, the operations of method 1300 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may detect an upstream RLF associated with an upstream link of a wireless backhaul, where the wireless backhaul includes a first wireless link between the relay device and a first upstream backhaul device. The operations of 1305 may be performed according to the methods described herein. In some examples, aspects of the operations of 1305 may be performed by an RLF detection manager as described with reference to FIGS. 7 through 11.

At 1310, the UE or base station may receive, from the first upstream backhaul device on the first wireless link, a second indication of the upstream RLF. The operations of 1310 may be performed according to the methods described herein. In some examples, aspects of the operations of 1310 may be performed by an upstream RLF manager as described with reference to FIGS. 7 through 11.

At 1315, the UE or base station may provide a first indication of the upstream RLF over a second wireless link between the relay device and a first downstream device. The operations of 1315 may be performed according to the methods described herein. In some examples, aspects of the operations of 1315 may be performed by an RLF alert manager as described with reference to FIGS. 7 through 11.

At 1320, the UE or base station may establish a third wireless link with a second upstream backhaul device based on the detected upstream RLF. The operations of 1320 may be performed according to the methods described herein. In some examples, aspects of the operations of 1320 may be performed by a backhaul manager as described with reference to FIGS. 7 through 11.

At 1325, the UE or base station may provide multiple-access services to one or more downstream devices, where providing the multiple-access services is based on backhaul communications between the relay device and the second upstream backhaul device over the third wireless link. The operations of 1325 may be performed according to the methods described herein. In some examples, aspects of the operations of 1325 may be performed by a service provider as described with reference to FIGS. 7 through 11.

Figure 14:
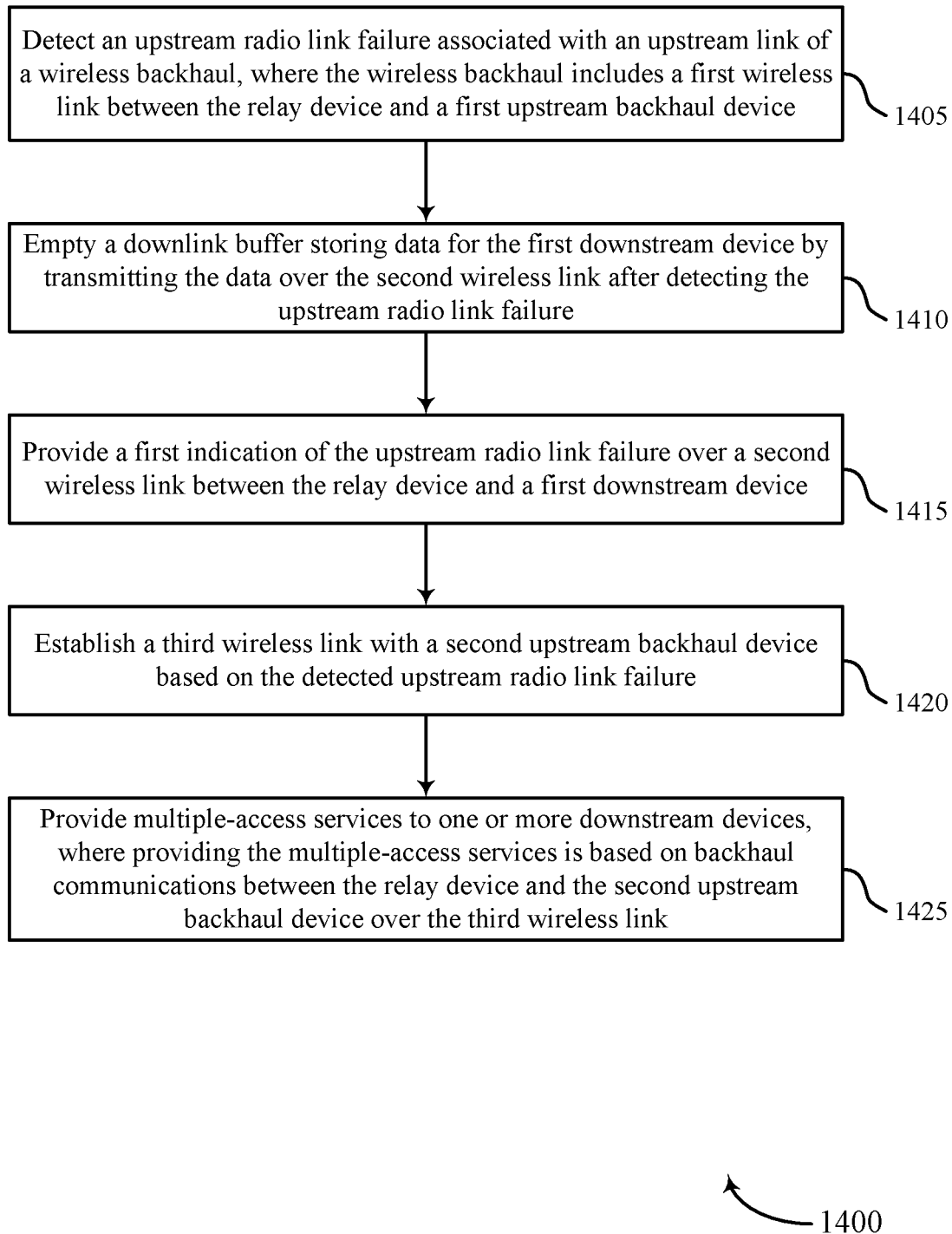

FIG. 14 shows a flowchart illustrating a method 1400 that supports management of RLF in wireless backhaul in accordance with aspects of the present disclosure. The operations of method 1400 may be implemented by a relay device, a UE 115, or base station 105 or its components as described herein. For example, the operations of method 1400 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may detect an upstream RLF associated with an upstream link of a wireless backhaul, where the wireless backhaul includes a first wireless link between the relay device and a first upstream backhaul device. The operations of 1405 may be performed according to the methods described herein. In some examples, aspects of the operations of 1405 may be performed by an RLF detection manager as described with reference to FIGS. 7 through 11.

At 1410, the UE or base station may empty a downlink buffer storing data for the first downstream device by transmitting the data over the second wireless link after detecting the upstream RLF. The operations of 1410 may be performed according to the methods described herein. In some examples, aspects of the operations of 1410 may be performed by a downlink buffer manager as described with reference to FIGS. 7 through 11.

At 1415, the UE or base station may provide a first indication of the upstream RLF over a second wireless link between the relay device and a first downstream device. The operations of 1415 may be performed according to the methods described herein. In some examples, aspects of the operations of 1415 may be performed by an RLF alert manager as described with reference to FIGS. 7 through 11.

At 1420, the UE or base station may establish a third wireless link with a second upstream backhaul device based on the detected upstream RLF. The operations of 1420 may be performed according to the methods described herein. In some examples, aspects of the operations of 1420 may be performed by a backhaul manager as described with reference to FIGS. 7 through 11.

At 1425, the UE or base station may provide multiple-access services to one or more downstream devices, where providing the multiple-access services is based on backhaul communications between the relay device and the second upstream backhaul device over the third wireless link. The operations of 1425 may be performed according to the methods described herein. In some examples, aspects of the operations of 1425 may be performed by a service provider as described with reference to FIGS. 7 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single-carrier FDMA (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communications media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a relay device, comprising:
   receiving, at the relay device and from a first upstream backhaul device, a first message comprising a first indication of an upstream radio link failure at a first upstream wireless backhaul link between the first upstream backhaul device and a second upstream backhaul device of a wireless backhaul, wherein the wireless backhaul comprises the first upstream wireless backhaul link, a second upstream wireless backhaul link between the relay device and the first upstream backhaul device different from the first upstream wireless backhaul link, and a downstream wireless backhaul link between the relay device and a first downstream device;
   initiating recovery procedures at the relay device based at least in part on the first indication of the upstream radio link failure;
   transmitting, to the first downstream device and using a scrambling sequence for the upstream radio link failure, a second message instructing the first downstream device to increase a number of measurements corresponding to a second relay device, wherein the scrambling sequence used indicates the upstream radio link failure over the downstream wireless backhaul link;
   suspending, after a delay associated with the recovery procedures failing at the relay device, transmission of synchronization channels and broadcast channels via the downstream wireless backhaul link between the relay device and the first downstream device; and
   transmitting, based at least in part on the upstream radio link failure, buffered data to the first downstream device via the downstream wireless backhaul link.

2. The method of claim 1, further comprising:
establishing a third upstream wireless backhaul link with a third upstream backhaul device based at least in part on the upstream radio link failure; and
transmitting a radio resource control (RRC) message to the third upstream backhaul device.

3. The method of claim 2, wherein the RRC message comprises one or more of: an RRC connection complete message, or an RRC connection resume message, or an RRC connection reestablishment.

4. The method of claim 1, wherein providing the second message is based at least in part on suspending multiple-access services, and wherein the multiple-access services comprise transmission of one or more radio channels of the downstream wireless backhaul link.

5. The method of claim 4, further comprising:
starting a timer upon detecting the upstream radio link failure, wherein suspension of the multiple-access services is based at least in part on expiry of the timer.

6. The method of claim 1, wherein the first downstream device comprises one or more of: a downstream relay device, or a user equipment.

7. The method of claim 1, wherein the first indication of the upstream radio link failure comprises one or more of: an identifier of a wireless backhaul link associated with the upstream radio link failure, or an identifier of an upstream backhaul device that initially detected the upstream radio link failure.

8. The method of claim 1, further comprising:
configuring the second message to comprise an identifier of a wireless backhaul link associated with the upstream radio link failure, or an identifier of an upstream backhaul device that initially detected the upstream radio link failure, or a combination thereof.

9. The method of claim 1, further comprising:
receiving a third indication of an available backhaul connection from one or more of: the first downstream device or a second downstream device, wherein a third upstream wireless backhaul link between the relay device and a third upstream backhaul device is based at least in part on the available backhaul connection.

10. The method of claim 1, further comprising:
emptying a downlink buffer storing data for the first downstream device by transmitting the data over the downstream wireless backhaul link after detecting the upstream radio link failure.

11. The method of claim 10, further comprising:
receiving an uplink scheduling request from the first downstream device; and
rejecting the uplink scheduling request based at least in part on the upstream radio link failure.

12. The method of claim 1, wherein a third upstream wireless backhaul link between the relay device and a third upstream backhaul device comprises at least one of a configured wireless backhaul link, an inactive wireless backhaul link, or a new wireless backhaul link.

13. The method of claim 1, wherein providing the message comprises:
performing one or more of: a unicast transmission, or a multi-cast transmission, or a broadcast transmission.

14. The method of claim 1, wherein a base station function of the relay device manages communications of the second upstream wireless backhaul link, and a user equipment-function of the relay device manages communications of the downstream wireless backhaul link.

15. The method of claim 1, wherein a third upstream wireless backhaul link between the relay device and a third upstream backhaul device is associated with a first anchor device and the second upstream wireless backhaul link is associated with a second anchor device, the first anchor device being different from the second anchor device.

16. An apparatus for wireless backhaul communications at a relay device, comprising:
a processor,
memory coupled with the processor; and
instructions stored in the memory and executable by the processor to cause the apparatus to:
receive, at the relay device and from a first upstream backhaul device, a first message comprising a first indication of an upstream radio link failure at a first upstream wireless backhaul link between the first upstream backhaul device and a second upstream backhaul device of a wireless backhaul, wherein the wireless backhaul comprises the first upstream wireless backhaul link, a second upstream wireless backhaul link between the relay device and the first upstream backhaul device different from the first upstream wireless backhaul link, and a downstream wireless backhaul link between the relay device and a first downstream device;
initiate recovery procedures at the relay device based at least in part on the first indication of the upstream radio link failure;
transmit, to the first downstream device and using a scrambling sequence for the upstream radio link failure, a second message instructing the first downstream device to increase a number of measurements corresponding to a second relay device, wherein the scrambling sequence used indicates the upstream radio link failure over the downstream wireless backhaul link;
suspend, after a delay associated with the recovery procedures failing at the relay device, transmission of synchronization channels and broadcast channels via the downstream wireless backhaul link between the relay device and the first downstream device; and
transmit, based at least in part on the upstream radio link failure, buffered data to the first downstream device via the downstream wireless backhaul link.

17. The apparatus of claim 16, wherein the instructions are further executable by the processor to cause the apparatus to:
establish a third upstream wireless backhaul link with a third upstream backhaul device based at least in part on the upstream radio link failure; and
transmit a radio resource control (RRC) message to the third upstream backhaul device.

18. The apparatus of claim 17, wherein the RRC message comprises one or more of: an RRC connection complete message, or an RRC connection resume message, or an RRC connection reestablishment.

19. The apparatus of claim 16, wherein the instructions are further executable by the processor to cause the apparatus to:
start a timer upon detecting the upstream radio link failure, and wherein the instructions to provide the second message are executable by the processor to cause the apparatus to suspend transmission of one or more radio channels of the downstream wireless backhaul link upon expiry of the timer.

20. An apparatus for wireless backhaul communications at a relay device, comprising:
means for receiving, at the relay device and from a first upstream backhaul device, a first message comprising a first indication of an upstream radio link failure at a first upstream wireless backhaul link between the first upstream backhaul device and a second upstream backhaul device of a wireless backhaul, wherein the wireless backhaul comprises the first upstream wireless backhaul link, a second upstream wireless backhaul link between the relay device and the first upstream backhaul device different from the first upstream wireless backhaul link, and a downstream wireless backhaul link between the relay device and a first downstream device;

means for initiating recovery procedures at the relay device based at least in part on the first indication of the upstream radio link failure;

means for transmitting, to the first downstream device and using a scrambling sequence for the upstream radio link failure, a second message instructing the first downstream device to increase a number of measurements corresponding to a second relay device, wherein the scrambling sequence used indicates the upstream radio link failure over the downstream wireless backhaul link;

means for suspending, after a delay associated with the recovery procedures failing at the relay device, transmission of synchronization channels and broadcast channels via the downstream wireless backhaul link between the relay device and the first downstream device; and means for transmitting, based at least in part on the upstream radio link failure, buffered data to the first downstream device via the downstream wireless backhaul link.

21. The apparatus of claim 20, further comprising:

means for establishing a third upstream wireless backhaul link with a third upstream backhaul device based at least in part on the upstream radio link failure; and means for transmitting a radio resource control (RRC) message to the third upstream backhaul device, wherein the RRC message comprises one or more of: an RRC connection complete message, or an RRC connection resume message, or an RRC connection reestablishment.

22. A non-transitory computer-readable medium storing code for wireless backhaul communications at a relay device, the code comprising instructions executable by a processor to:

receive, at the relay device and from a first upstream backhaul device, a first message comprising a first indication of an upstream radio link failure at a first upstream wireless backhaul link between the first upstream backhaul device and a second upstream backhaul device of a wireless backhaul, wherein the wireless backhaul comprises the first upstream wireless backhaul link, a second upstream wireless backhaul link between the relay device and the first upstream backhaul device different from the first upstream wireless backhaul link, and a downstream wireless backhaul link between the relay device and a first downstream device;

initiate recovery procedures at the relay device based at least in part on the first indication of the upstream radio link failure;

transmit, to the first downstream device and using a scrambling sequence for the upstream radio link failure, a second message instructing the first downstream device to increase a number of measurements corresponding to a second relay device, wherein the scrambling sequence used indicates the upstream radio link failure over the downstream wireless backhaul link;

suspend, after a delay associated with the recovery procedures failing at the relay device, transmission of synchronization channels and broadcast channels via the downstream wireless backhaul link between the relay device and the first downstream device; and transmit, based at least in part on the upstream radio link failure, buffered data to the first downstream device via the downstream wireless backhaul link.

23. The non-transitory computer-readable medium of claim 22, wherein the code comprises instructions executable by the processor to:

establish a third upstream wireless backhaul link with a third upstream backhaul device based at least in part on the upstream radio link failure; and transmit a radio resource control (RRC) message to the third upstream backhaul device, wherein the RRC message comprises one or more of: an RRC connection complete message, or an RRC connection resume message, or an RRC connection reestablishment.

* * * * *